(12) United States Patent
Lee

(10) Patent No.: US 11,516,102 B2
(45) Date of Patent: Nov. 29, 2022

(54) SYSTEMS AND METHODS FOR BANDWIDTH ALLOCATION AT WIRELESS INTEGRATED ACCESS BACKHAUL NODES

(71) Applicant: Verizon Patent and Licensing Inc., Basking Ridge, NJ (US)

(72) Inventor: Jay J. Lee, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 71 days.

(21) Appl. No.: 17/173,684

(22) Filed: Feb. 11, 2021

(65) Prior Publication Data
US 2022/0255830 A1 Aug. 11, 2022

(51) Int. Cl.
H04L 43/0888 (2022.01)
H04W 28/08 (2009.01)
H04W 24/08 (2009.01)

(52) U.S. Cl.
CPC ......... H04L 43/0888 (2013.01); H04W 24/08 (2013.01); H04W 28/0804 (2020.05)

(58) Field of Classification Search
CPC .......... H04L 43/0888; H04W 28/0804; H04W 24/08
See application file for complete search history.

(56) References Cited

U.S. PATENT DOCUMENTS

| | | | | |
|---|---|---|---|---|
| 2009/0059790 A1* | 3/2009 | Calvert | .................. | H04W 8/04 370/235 |
| 2012/0082115 A1* | 4/2012 | Puthenpura | ........... | H04W 28/20 370/329 |
| 2013/0208589 A1* | 8/2013 | Lopez Toledo | ....... | H04J 3/1694 370/336 |
| 2014/0349668 A1* | 11/2014 | Maric | .................... | H04W 28/22 455/452.2 |
| 2014/0378153 A1* | 12/2014 | Puthenpura | ........... | H04W 28/16 455/452.1 |
| 2015/0024771 A1* | 1/2015 | Roddy | .................. | H04W 28/08 455/452.2 |
| 2018/0092139 A1* | 3/2018 | Novlan | .................. | H04W 76/12 |
| 2019/0289500 A1* | 9/2019 | Abedini | ................ | H04W 28/16 |
| 2019/0289502 A1* | 9/2019 | Abedini | ................ | H04W 28/26 |
| 2020/0044732 A1* | 2/2020 | Cui | ........................ | H04W 76/50 |
| 2020/0045563 A1* | 2/2020 | Luo | ........................ | H04W 52/42 |

(Continued)

FOREIGN PATENT DOCUMENTS

WO WO-2020256606 A1 * 12/2020
WO WO-2022033667 A1 * 2/2022
WO WO-2022154701 A1 * 7/2022

*Primary Examiner* — Shah M Rahman

(57) ABSTRACT

A system described herein may provide a technique for the determination of threshold or maximum bandwidths for links between nodes and/or User Equipment ("UEs") in an Integrated Access Backhaul system. The maximum bandwidth for a given link may be a function of one or more of: (a) an amount of throughput associated with the link over a given time period, (b) an amount of system-wide throughput associated with the same type of link over the given time period, (c) an amount of throughput over the given time period for links of the same type that are associated with at least a threshold measure of channel quality, (d) a total system bandwidth or capacity, and (e) a total amount of throughput associated with the nodes over the given time period.

20 Claims, 15 Drawing Sheets

(56) References Cited

U.S. PATENT DOCUMENTS

| | | | |
|---|---|---|---|
| 2020/0351930 A1* | 11/2020 | Luo | H04L 1/1887 |
| 2020/0413292 A1* | 12/2020 | Liu | H04W 28/0835 |
| 2021/0058826 A1* | 2/2021 | Mao | H04W 28/0933 |
| 2021/0075496 A1* | 3/2021 | Mildh | H04B 7/15528 |
| 2021/0211939 A1* | 7/2021 | Teyeb | H04L 47/12 |
| 2021/0235325 A1* | 7/2021 | Desai | H04W 8/04 |
| 2022/0022093 A1* | 1/2022 | Liu | H04W 28/0278 |
| 2022/0070732 A1* | 3/2022 | Wang | H04W 28/0804 |
| 2022/0078751 A1* | 3/2022 | Uchiyama | H04W 72/10 |
| 2022/0116821 A1* | 4/2022 | Wei | H04L 27/2636 |

* cited by examiner

801

| Cell ID | Link | Max. bandwidth |
|---|---|---|
| 103-1 | IAB Link 1 | $14/60*BW\_BH$ |
| 103-1 | IAB Link 2 | $BW\_BH_{default}$ |
| 103-1 | Access Link 1 | $1/6*BW\_AC$ |
| 103-1 | Access Link 2 | $BW\_AC_{default}$ |
| 103-1 | Access Link 3 | $3/6*BW\_AC$ |
| 103-2 | IAB Link 2 | $BW\_BH_{default}$ |
| 103-2 | IAB Link 3 | $13/60*BW\_BH$ |
| 103-2 | Access Link 4 | $BW\_AC_{default}$ |
| 103-2 | Access Link 5 | $2/6*BW\_AC$ |

| Link | Cell/UE IDs | Max. bandwidth |
|---|---|---|
| IAB Link 1 | 103-1, 101 | $14/60*BW\_BH$ |
| IAB Link 2 | 103-1, 103-2 | $BW\_BH_{default}$ |
| IAB Link 3 | 103-2, 101 | $13/60*BW\_BH$ |
| Access Link 1 | 103-1, 109-1 | $1/6*BW\_AC$ |
| Access Link 2 | 103-1, 109-2 | $BW\_AC_{default}$ |
| Access Link 3 | 103-1, 109-3 | $3/6*BW\_AC$ |
| Access Link 4 | 103-2, 109-4 | $BW\_AC_{default}$ |
| Access Link 5 | 103-2, 109-5 | $2/6*BW\_AC$ |

SYSTEMS AND METHODS FOR BANDWIDTH ALLOCATION AT WIRELESS INTEGRATED ACCESS BACKHAUL NODES

BACKGROUND

Wireless telecommunication networks provide network connectivity to user equipment ("UE"), such as mobile telephones or other wireless communication devices, via a radio access network ("RAN"). A RAN may include multiple base stations, which may be distributed geographically, through which UEs may connect. The RAN may communicate via one or more backhaul links, such as fiber links or other wired links, with a core network, such as an Evolved Packet Core ("EPC"), a Fifth Generation ("5G") core ("5GC"), and/or other type of core network.

BRIEF DESCRIPTION OF THE DRAWINGS

FIGS. 8A and 8B illustrate example data structures that may be used to propagate determined bandwidth allocations to a set of IAB nodes, in accordance with some embodiments;

DETAILED DESCRIPTION OF EXAMPLE EMBODIMENTS

The following detailed description refers to the accompanying drawings. The same reference numbers in different drawings may identify the same or similar elements.

Some wireless networks may include RANs that utilize an IAB architecture, in which base stations of a RAN may be used as "nodes" to wirelessly relay traffic between a core network and User Equipment ("UEs"), such as mobile telephones, Internet of Things ("IoT") devices, Machine-to-Machine ("M2M") devices, and/or other types of devices. In some situations, one IAB node may wirelessly relay traffic between the core network and another IAB node.

Figure 1:
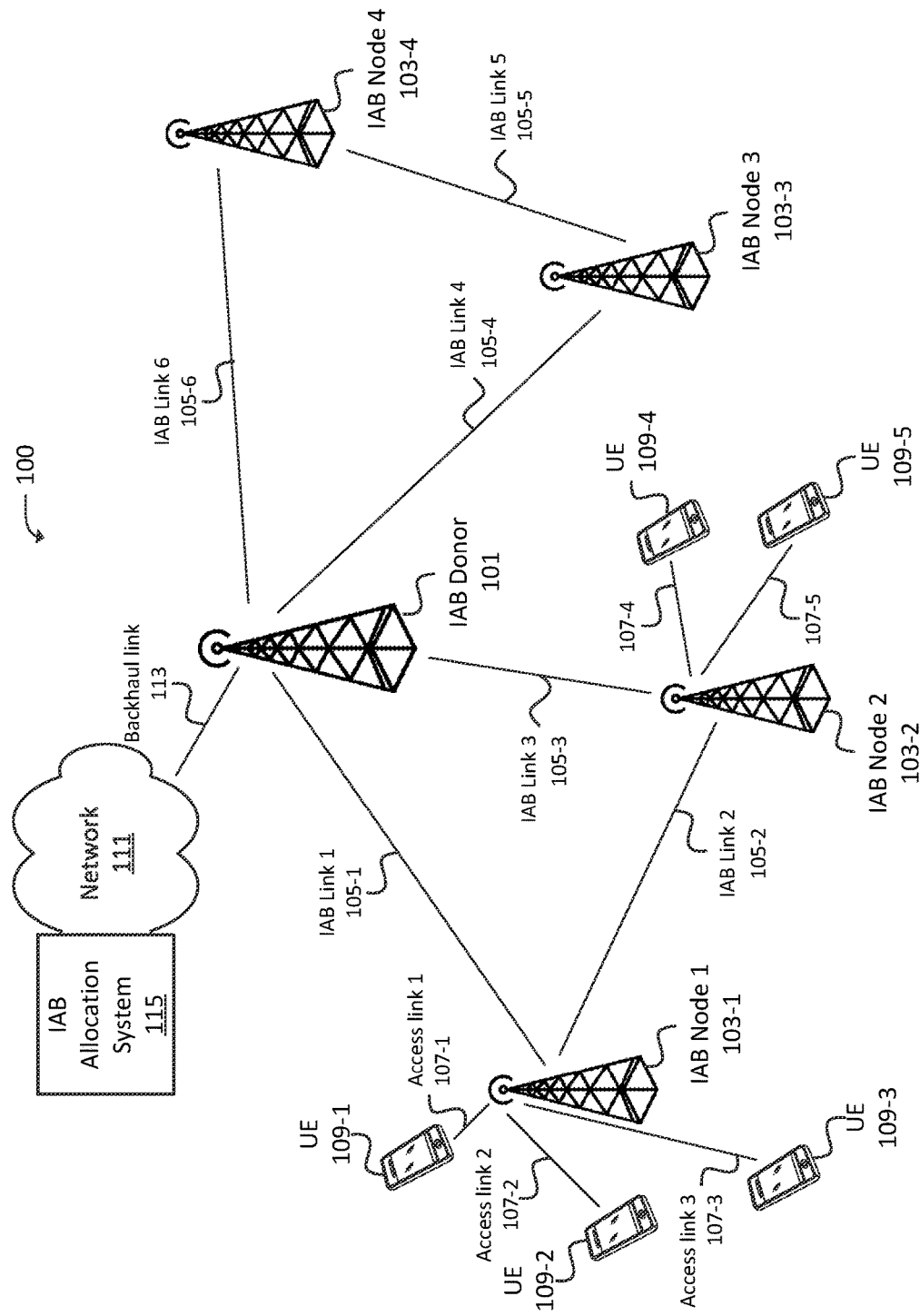
FIG. 1 illustrates an example environment in which one or more embodiments, described herein, may be implemented.

FIG. 1 illustrates an example environment 100, which may include IAB donor 101 and a set of IAB nodes 103 (e.g., IAB nodes 103-1 through 103-4 in this example). IAB donor 101 and IAB nodes 103 may be, may include, and/or may be implemented by one or more base stations of a RAN, such as one or more evolved Node Bs ("eNBs"), Next Generation Node Bs ("gNBs"), or another type of base station. In some embodiments, IAB donor 101 and IAB nodes 103 may implement an IAB architecture, in which IAB donor 101 and/or IAB nodes 103 may communicate via respective IAB links 105. For example, as shown, IAB link 105-1 (sometimes referred to herein as "IAB Link 1") may be a link between IAB donor 101 and IAB node 103-1; IAB link 105-2 (sometimes referred to herein as "IAB Link 2") may be a link between IAB node 103-1 and IAB node 103-2; IAB link 105-3 (sometimes referred to herein as "IAB Link 3") may be a link between IAB donor 101 and IAB node 103-2; and so on.

As further shown, respective IAB nodes 103 may be communicatively coupled to one or more UEs 109. For example, IAB node 103-1 may be communicatively coupled to UEs 109-1 through 109-3, and IAB node 103-2 may be communicatively coupled to UEs 109-4 and 109-5. While not explicitly shown here, IAB nodes 103-1 and 103-2 may be communicatively coupled to additional UEs 109, and/or other IAB nodes 103 may be communicatively coupled to other UEs 109. Each UE 109 may be associated with a respective access link 107, which may represent a link between UE 109 and a respective IAB node 103. For example, UE 109-1 and IAB node 103-1 may be associated with access link 107-1 (sometimes referred to herein as "Access Link 1"); UE 109-2 and IAB node 103-1 may be associated with access link 107-2 (sometimes referred to herein as "Access Link 2"); and so on.

As referred to herein, "IAB links" and "access links" may refer to network layer links and/or flows, Layer 3 links (e.g., referring to the Open Systems Interconnection ("OSI") model or other suitable network model), and/or other logical links between respective IAB nodes 103 and/or UEs 109. For example, as discussed herein, a given IAB link 105 and/or access link 107 may be associated with measures of throughput, bandwidth, or the like, indicating amounts and/or rates of traffic (e.g., Gigabytes ("GB"), GB per second ("GB/s"), etc.) sent and/or received via such link.

IAB donor 101 may be communicatively coupled to network 111 via backhaul link 113. Network 111 may be, may include, and/or may be communicatively coupled to a core network, such as an EPC, a 5GC, and/or some other type of core network. In some embodiments, network 111 may be, may include, may implement, and/or may be communicatively coupled to one or more "edge" devices or systems, which may include one or more Multi-Access/Mobile Edge Computing ("MEC") devices, referred to sometimes herein simply as a "MECs." Network 111 may include, and/or may be communicatively coupled to, IAB Allocation System ("IAS") 115, which may perform one or more operations described herein with respect to bandwidth scheduling for IAB links 105 and/or access links 107 for IAB donor 101 and/or one or more IAB nodes 103. In some embodiments, network 111 may be implemented by one or more MECs communicatively coupled to IAB donor 101. Backhaul link 113 may be or may include one or more wired links between IAB donor 101 and network 111, such as a fiber link or other suitable type of wired link.

FIGS. 2-6 illustrate example computations that may be performed by IAS 115, in order to determine bandwidth allocations for IAB donor 101 and/or IAB nodes 103. For example, such bandwidth allocations may be used by such nodes to preferentially prioritize, queue, weight, etc. IAB traffic over access traffic, or vice versa. Additionally, or alternatively, the bandwidth allocations may include maximum levels of IAB traffic throughput and/or access traffic throughput, where the enforcement or implementation of such bandwidth allocations by IAB donor 101 and/or IAB nodes 103 may alleviate or eliminate network congestion conditions.

Figure 2:
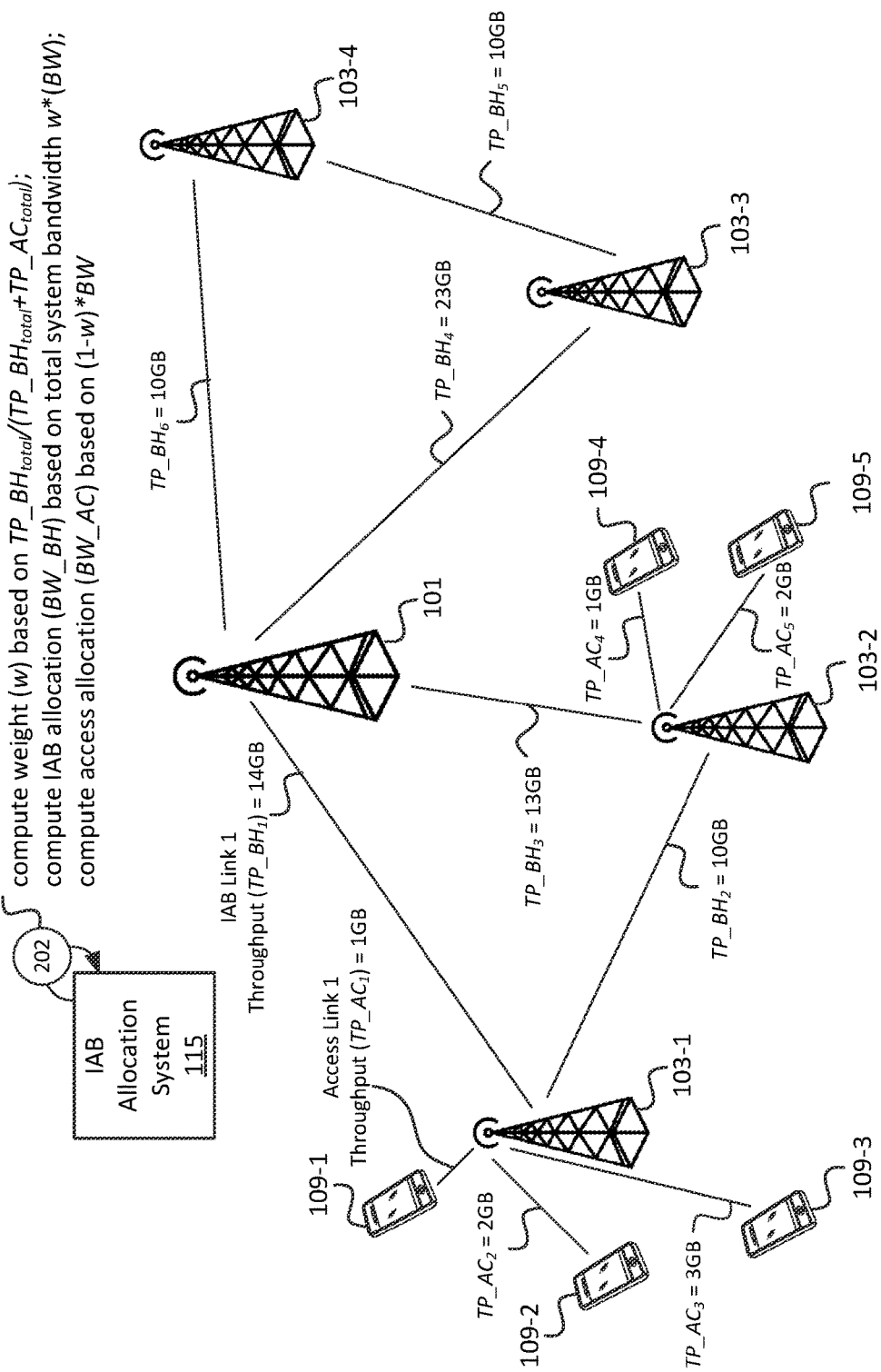
FIGS. 2-6 conceptually illustrate example computations that may be used in accordance with some embodiments to determine a maximum bandwidth allocation for links associated with one or more Integrated Access Backhaul ("IAB") nodes.

As shown in FIG. 2, IAS 115 may identify (at 202) a throughput associated with each respective IAB link 105 and access link 107 over a given time period. In some embodiments, IAS 115 may receive throughput information (e.g., indicating an amount of throughput used, on a per-node basis, for access traffic and/or IAB traffic) from IAB donor 101, IAB nodes 103, and/or some other suitable device or system that determines amounts of traffic sent and/or received by IAB donor 101 and/or IAB nodes 103.

The throughput (e.g., amount of traffic sent and/or received over the time period) associated with a given access link 107-$i$ may be referred to as $TP\_AC_i$, while the throughput associated with a given IAB link 105-$j$ may be referred to as $TP\_BH_j$. For example, as shown in FIG. 2, the throughput $TP\_AC_1$ associated with access link 107-1 (i.e., Access Link 1) over the given time period may be 1 GB, and the throughput $TP\_BH_1$ associated with IAB link 105-1 (i.e., IAB Link 1) over the given time period may be 14 GB.

IAS 115 may further compute the aggregate or total throughput associated with access links 107 over the given time period, where such aggregate or total throughput is referred to herein as $TP\_AC_{total}$. In this example, $TP\_AC_{total}$ may be 9 GB (i.e., the sum of the respective throughputs (1 GB+2 GB+3 GB+1 GB+2 GB) associated with Access Links 1 through 4).

IAS 115 may additionally compute the aggregate or total throughput associated with IAB links 105 over the given time period, where such aggregate or total throughput is referred to herein as $TP\_BH_{total}$. In this example, $TP\_BH_{total}$ may be 80 GB (i.e., the sum of the respective throughputs (14 GB+10 GB+13 GB+23 GB+10 GB+10 GB) associated with IAB Links 1 through 6).

IAS 115 may further compute a weight w based on a ratio of the throughput used for IAB links to the total throughput used over the given time period. In some embodiments, the weight w may be computed as $TP\_BH_{total}/(TP\_BH_{total}+TP\_AC_{total})$ and/or some other function of the throughput used for IAB links and the total throughput used by IAB donor 101 and IAB nodes 103 over the given time period.

IAS 115 may additionally compute respective allocations BW_BH and BW_AC for IAB traffic and access traffic, respectively, based on the computed weight w and further based on a total system bandwidth BW. The total system bandwidth BW may refer to an aggregate or total capacity of throughput that is able to be processed by IAB donor 101 and IAB nodes 103 over the given time window. For example, each IAB donor 101 and/or IAB node 103 may be associated with a respective maximum bandwidth capacity, which may be specified by a manufacturer or vendor associated with IAB donor 101 and/or IAB node 103, and/or may be determined using artificial intelligence/machine learning ("AI/ML") techniques or other suitable techniques. The total system bandwidth BW may therefore be a function (e.g., a sum and/or other function) of the respective maximum capacities associated with IAB donor 101 and each IAB node 103. In some embodiments, the IAB allocation BW_BH may be calculated as w*BW, and the access allocation BW_AC may be calculated as (1−w)*BW. These allocations BW_BH and BW_AC may be used in ultimately determining threshold maximum bandwidth thresholds for IAB and access traffic associated with respective nodes in accordance with some embodiments, as described below.

Figure 3:
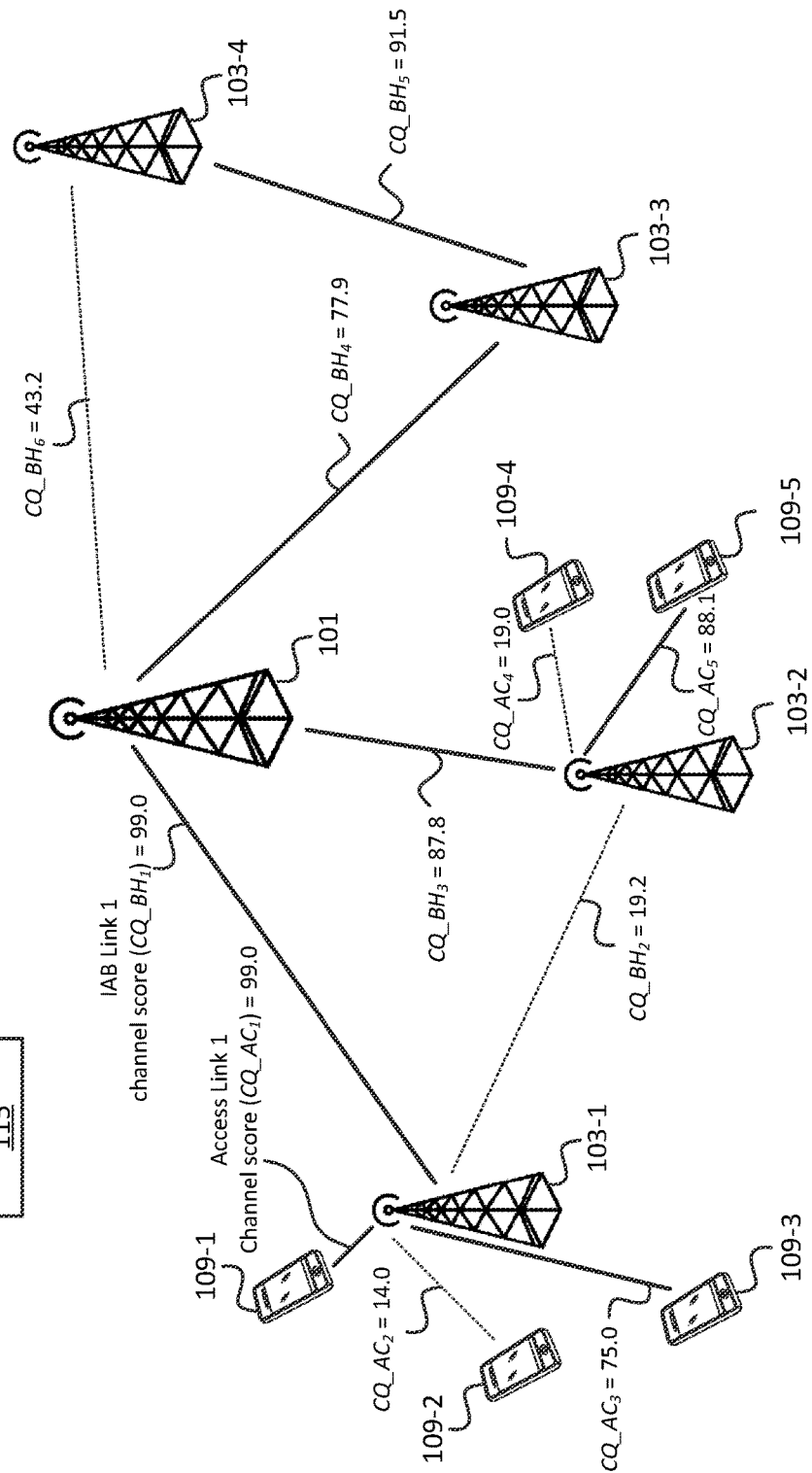

As shown in FIG. 3, IAS 115 may further compute (at 302) channel quality scores associated with respective IAB links 105 and access links 107. Additionally, or alternatively, IAS 115 may receive such scores or raw channel quality metrics from IAB donor 101, IAB nodes 103, and/or some other device or system. Channel quality scores may include, may indicate, may be derived from, and/or may otherwise be based on signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Reference Signal Received Quality ("RSRQ") metrics, Channel Quality Indicator ("CQI") metrics, and/or other measures of channel or signal quality.

A channel quality score for access link 107-$i$ may be referred to as $CQ\_AC_i$, and a channel quality score for IAB link 105-$j$ may be referred to as $CQ\_BH_j$. For example, as shown, IAB Link 1 may be associated with a channel quality score $CQ\_BH_1$ of 99.0; IAB Link 6 may be associated with a channel quality score $CQ\_BH_6$ of 43.2; Access Link 1 may be associated with a channel quality score $CQ\_AC_1$ of 99.0; Access Link 2 may be associated with a channel quality score $CQ\_AC_2$ of 19.2; and so on.

IAS 115 may further identify channels with channel quality scores below one or more threshold scores. In some embodiments, IAB links 105 and access links 107 may be associated with different threshold scores. For example, IAB links 105 may be associated with a first threshold score, while access links 107 may be associated with a second threshold score. In some embodiments, IAB links 105 and access links 107 may be associated with the same threshold score. In some embodiments, different IAB links 105 may be associated with different threshold scores. For example, a first IAB link 105 may be associated with a first threshold score, while a second IAB link 105 may be associated with a second threshold score. In some embodiments, some or all of the threshold scores may be determined or adjusted using AI/ML techniques or other suitable techniques, in order to maximize a yield from such thresholds. For example, the "yield" may be measured in terms of throughput at a given node, packet error and/or loss rate at the node, and/or other measures of performance or reliability associated with the node.

In this example, as denoted by the dashed lines, the channel quality scores $CQ\_BH_2$ and $CQ\_BH_6$ of 19.2 and 43.2 associated with IAB Links 2 and 6, respectively, may not exceed the one or more threshold scores. Similarly, the channel quality score $CQ\_AC_4$ of 19.0, associated with Access Link 4, may also not exceed one or more applicable threshold scores. On the other hand, as denoted by the bolded black lines in the figures, the respective channel quality scores for IAB Links 1, 3, 4, and 5, as well as for Access Links 1, 3, and 5 may exceed the applicable threshold scores.

Figure 4:
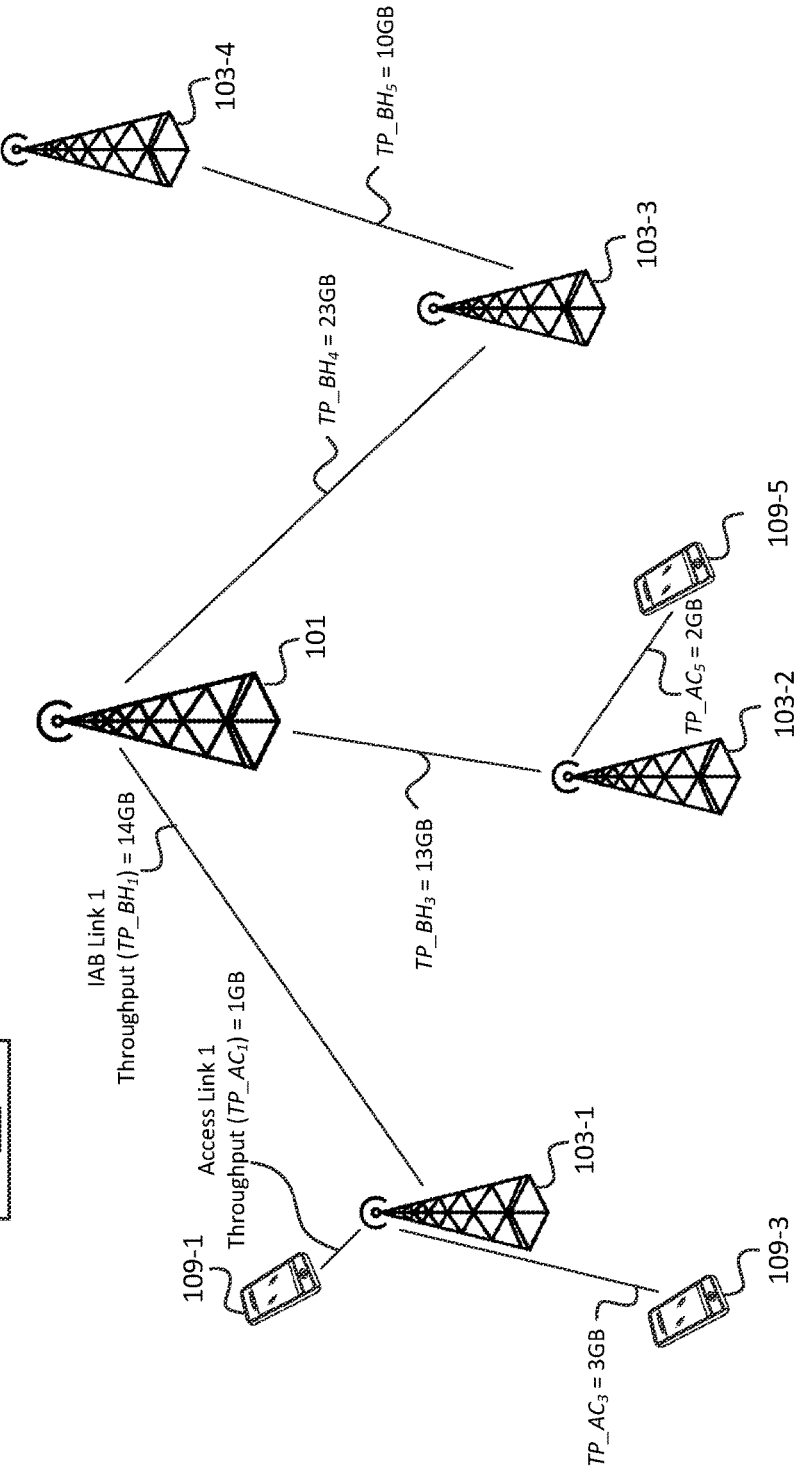

As shown in FIG. 4, IAS 115 may calculate (at 402) a total throughput $TP\_AC_{CQ}$ for the access links 107 determined (at 302) as being associated with channel quality scores CQ_AC exceeding the respective threshold scores, as well as a total throughput $TP\_BH_{CQ}$ for the IAB links 105 determined (at 302) as being associated with channel quality scores CQ_BH exceeding the respective threshold scores. In this example, the total throughput $TP\_AC_{CQ}$ for access links 107 may be based on the throughput TP_AC associated with Access Links 1, 3, and 5 (e.g., not Access Links 2 and/or 4). As shown, $TP\_AC_{CQ}$ in this example may be 6 GB (1 GB+3 GB+2 GB). Similarly, the total throughput $TP\_BH_{CQ}$ for IAB links 105 may be based on the throughput TP_BH associated with IAB Links 1, 3, 4, and 5 (e.g., not IAB Links 2 and/or 6). As shown, $TP\_BH_{CQ}$ in this example may be 60 GB (14 GB+13 GB+23 GB+10 GB).

Figure 5:
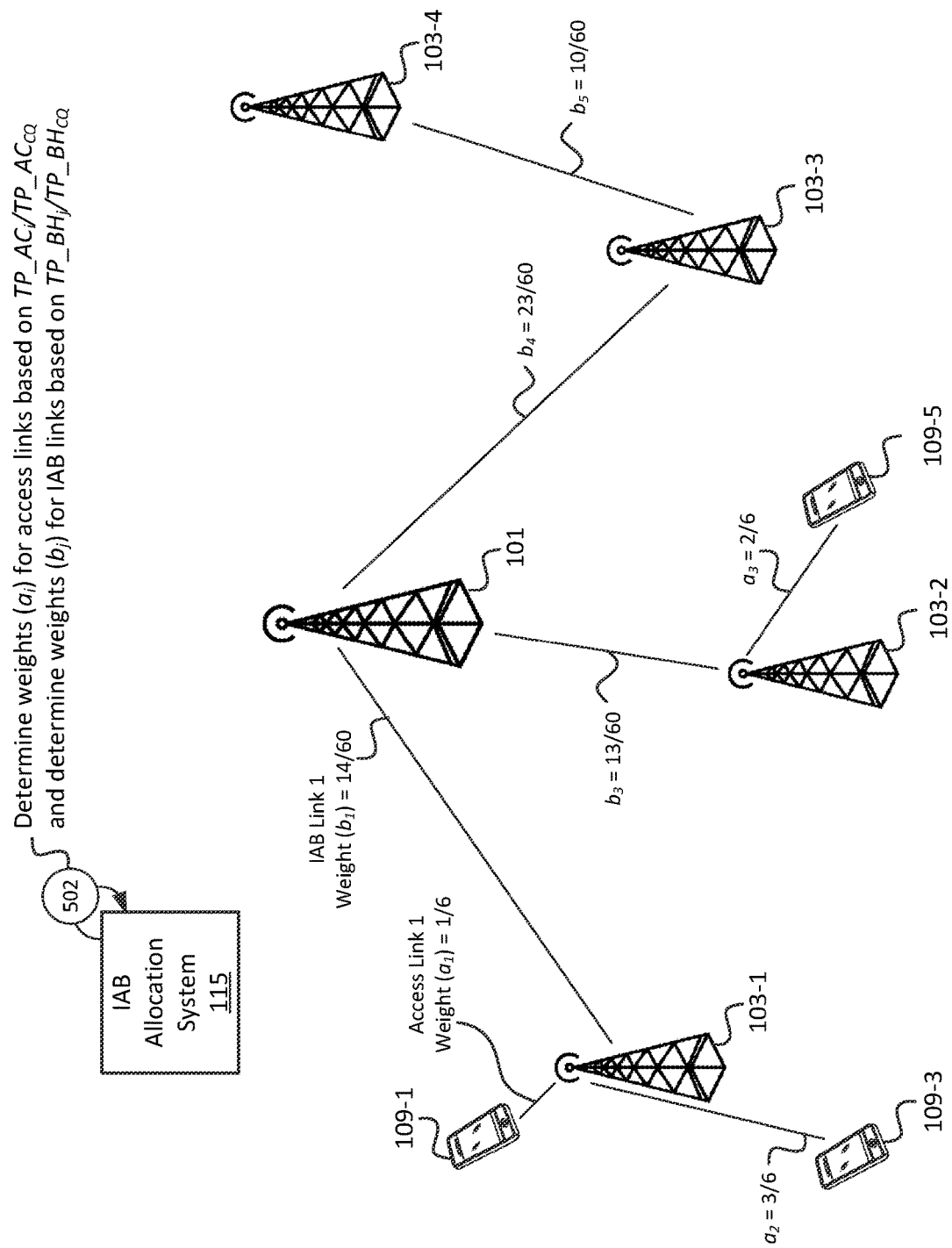

As shown in FIG. 5, IAS 115 may determine (at 502) a respective weight a for each access link 107 associated with a channel quality score CQ_AC exceeding the respective threshold scores, and a respective weight b for each IAB link 105-$j$ associated with a channel quality score CQ_BH exceeding the respective threshold scores. For example, a given weight $a_i$ for access link 107-$i$ may be based on the throughput $TP\_AC_i$ associated with access link 107-$i$, as well as the total throughput $TP\_AC_{CQ}$ for the access links 107 determined (at 302) as being associated with channel quality scores CQ_AC exceeding the respective threshold scores. For example, as shown, weight $a_1$ for Access Link 1 may be calculated as $a_1 = TP\_AC_1/TP\_AC_{CQ} = 1$ GB/6 GB=1/6.

Similarly, a given weight $b_j$ for IAB link 105-$j$ may be based on the throughput $TP\_BH_j$ associated with IAB link 105-$j$, as well as the total throughput $TP\_BH_{CQ}$ for the IAB links 105 determined (at 302) as being associated with channel quality scores CQ_BH exceeding the respective threshold scores. For example, as shown, weight $b_1$ for IAB Link 1 may be calculated as $b_1 = TP\_BH_1/TP\_BH_{CQ} = 14$ GB/60 GB=14/60 (fractions are not reduced here for sake of explanation).

Figure 6:
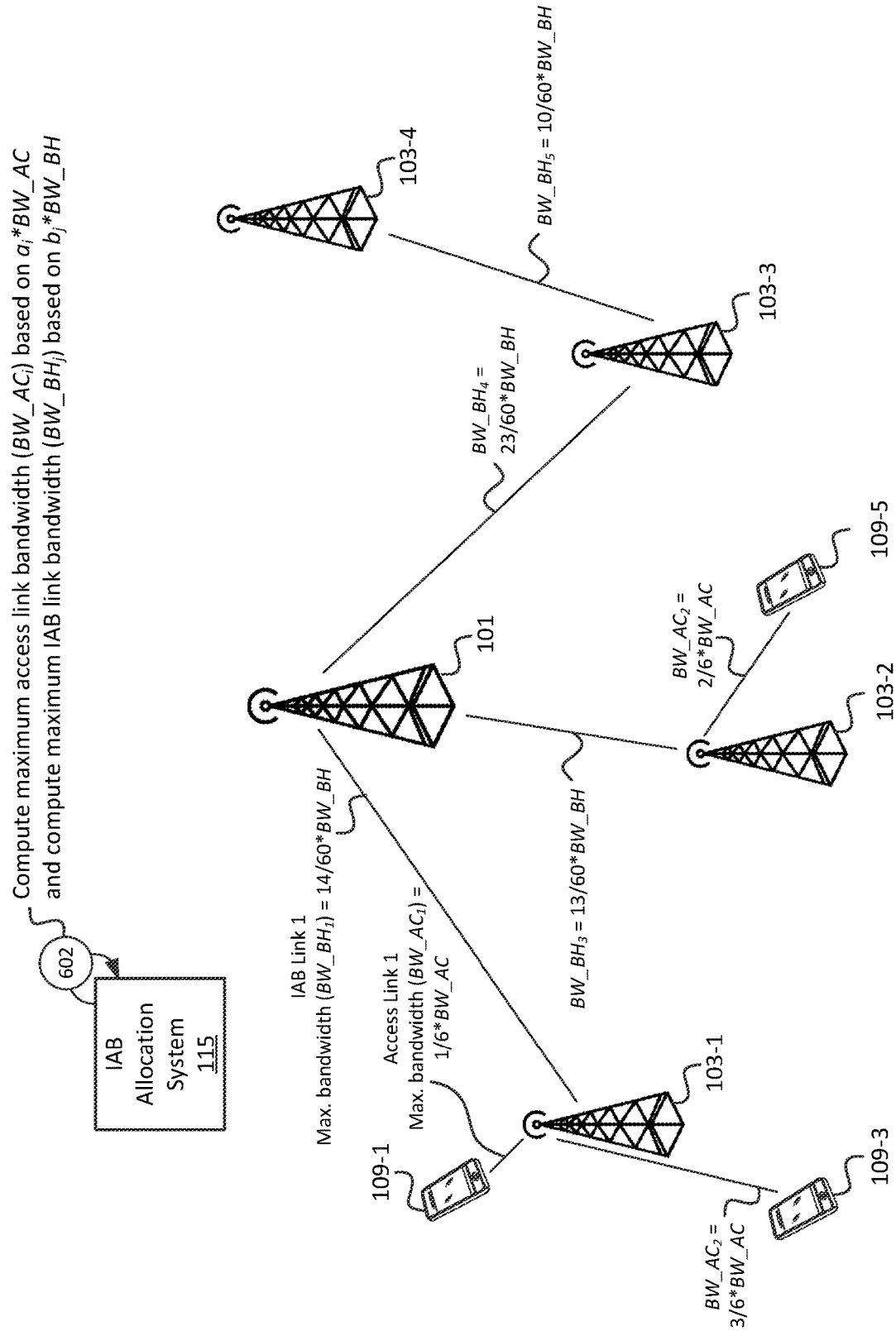

As shown in FIG. 6, IAS 115 may compute (at 602) a per-link maximum bandwidth for the IAB links 105 and access links 107 associated with channel quality scores CQ_BH and CQ_AC, respectively, that exceed the suitable threshold scores. Such per-link maximum bandwidths may be determined based on the allocations BW_BH and BW_AC, described above with respect to FIG. 2.

For example, the maximum bandwidth $BW\_AC_i$ for a given access link 107-$i$ may be based on weight $a_i$ (described above with respect to FIG. 5) and the access allocation BW_AC. As shown, for instance, maximum bandwidth $BW\_AC_1$ for Access Link 1 may be computed as $a_1 *BW\_AC$. As noted above, access allocation BW_AC may have been computed as a function of: (a) $TP\_AC_{total}$ (e.g., the total throughput used, among IAB donor 101 and set of IAB nodes 103 over a given time period, for access traffic), (b) $TP\_BH_{total}$ (e.g., the total throughput used, among IAB donor 101 and set of IAB nodes 103 over the given time period, for IAB traffic), and (c) BW (e.g., a total or aggregate traffic capacity associated with IAB donor 101 and set of IAB nodes 103 over the given time period).

As another example, the maximum bandwidth $BW\_BH_j$ for a given IAB link 105-$j$ may be based on weight $b_j$ (described above with respect to FIG. 5) and the IAB allocation BW_BH. As shown, for instance, maximum bandwidth $BW\_BH_1$ for IAB Link 1 may be computed as $b_1 *BW\_BH$. As noted above, access allocation BW_BH may have been computed as a function of $TP\_AC_{total}$, $TP\_BH_{total}$, and BW. As discussed below, the maximum bandwidths $BW\_AC_i$ and $BW\_BH_j$ for respective access links 107 and IAB links 105 may indicate a maximum amount of traffic that may be processed (e.g., sent and/or received) via such links in a given time window. Such maximum bandwidths may be high enough to accommodate traffic according to respective historical and/or expected levels of throughput along respective links, but may aid in alleviating or eliminating network congestion in situations where traffic to be sent and/or received over such links exceeds such historical and/or expected levels of throughput.

While the above description provides examples of maximum bandwidths $BW\_AC_i$ and $BW\_BH_j$ being computed for access links 107 and IAB links 105 that are associated with channel quality scores $CQ\_AC_i$ and $CQ\_BH_j$ that exceed respective threshold scores, IAS 115 may, in some embodiments, compute maximum bandwidths for links that are not associated with channel quality scores that exceed respective threshold scores. For example, IAS 115 may set maximum bandwidths for such links to a "default" value, may set the maximum bandwidths for such links to 0 (e.g., which may cause any traffic received on such links to be dropped, de-prioritized, etc.), etc.

Figure 7:
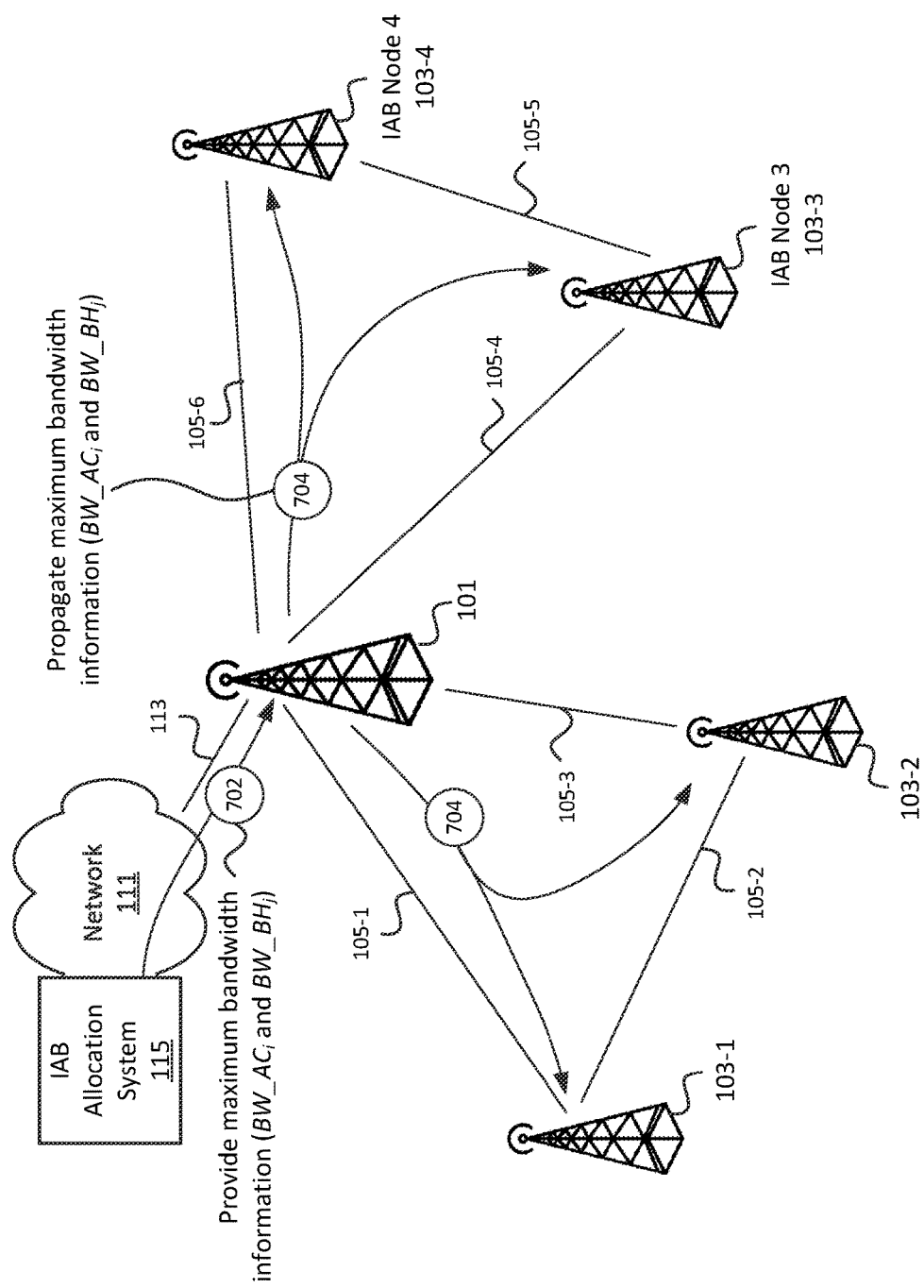
FIG. 7 illustrates an example propagation of determined maximum bandwidth allocations to a set of IAB nodes, in accordance with some embodiments.

Once IAS 115 has determined the maximum bandwidth information $BW\_AC_i$ and $BW\_BH_j$ for IAB links 105 and access links 107, such information may be provided to IAB donor 101 and/or IAB nodes 103. For example, as shown in FIG. 7, IAS 115 may output (at 702) the maximum bandwidth information to IAB donor 101 (e.g., via backhaul link 113 and/or some other suitable communication pathway), and IAB donor 101 may propagate (at 704) the information to IAB nodes 103. In some embodiments, IAB donor 101 may propagate (at 704) such information by wirelessly broadcasting the information (e.g., via a Master Information Block ("MIB"), a System Information Block ("SIB"), or some other suitable type of broadcast). In such embodiments, the maximum bandwidth information may be indicated with a cell identifier or other suitable identifier associated with a given node (e.g., associated with IAB donor 101 and/or a respective IAB node 103) and/or UE 109. In some embodiments, such information may be broadcast (e.g., via an X2 interface, via respective IAB links 105 between IAB donor 101 and respective IAB nodes 103, and/or some other suitable communication pathway) by IAB donor 101 to IAB nodes 103.

In some embodiments, IAB donor 101 may provide maximum bandwidth information, associated with particular IAB nodes 103, to such IAB nodes 103 via direct messaging (e.g., via the X2 interface or other suitable communication pathway). For example, IAB donor 101 may provide maximum bandwidth information, for links associated with IAB node 103-1 (e.g., IAB link 105-1, IAB link 105-2, access link 107-1, access link 107-2, and access link 107-3) to IAB node 103-1. Further, in some embodiments, IAB donor 101 may refrain from providing such information, associated with IAB node 103-1, to one or more other IAB nodes 103.

FIGS. 8A and 8B illustrate example data structures 801 and 803, respectively, that may be provided to IAB donor 101 and/or IAB nodes 103. For example, IAS 115 may provide some or all of the information reflected in data structures 801 and/or 803, and/or IAB donor 101 may generate data structures 801 and/or 803 based on information provided by IAS 115. While data structures 801 and 803 are shown as tables, in practice, data structures 801 and 803 may take the form of one or more different types of data structures. Further, in practice, the information reflected in data structures 801 and/or 803 may be arranged or provided in a different manner.

As shown in FIG. 8A, for example, data structure 801 may include maximum bandwidth information for particular IAB node 103-link pairs. The "Cell ID" field in data structure 801 may include a cell identifier (e.g., Internet Protocol ("IP") address, Cell ID, or other suitable indicator) of respective IAB nodes 103. The "Link" field in data structure 801 may include an identifier of a particular link, and/or may include an identifier of a particular node or UE (e.g., IAB donor 101, IAB node 103, or UE 109) with which the link is associated.

For example, as indicated in data structure 801, the pair of IAB node 103-1 and IAB Link 1 may be associated with the maximum bandwidth of 14/60*BW_BH. As noted above, BW_BH may be a function of TP_AC$_{total}$ (e.g., a total amount of system throughput used for access links over a given time period), TP_BH$_{total}$ (e.g., a total amount of system throughput used for IAB links over the given time period), and BW (e.g., a total amount of system capacity over the given time period). While BW_BH is reflected here as a variable, in practice, an actual value (e.g., number) may be used, such that the example maximum bandwidth of 14/60*BW_BH for this link may be reflected in data structure 801 as a numerical value. As noted above, the "Link" field for this link may include an identifier (e.g., "IAB Link 1" or other suitable identifier) and/or an identifier of another node or UE associated with this link (e.g., IAB donor 101, in this example).

As further shown in FIG. 8A, the maximum bandwidth for the pair of IAB node 103-1 and IAB Link 2 may be a default bandwidth BW_BH$_{default}$. The other values shown in data structure 801 may reflect example values shown in FIGS. 2-6. As noted above, data structure 801 may be broadcast to multiple IAB nodes 103, which may identify particular fields relevant to such IAB nodes 103 and discard the remaining information. For example, IAB node 103-1 may identify and store the maximum bandwidth information pertaining to IAB node 103-1 (e.g., for IAB Links 1 and 2 and Access Links 1-3), and may discard (e.g., not store) the maximum bandwidth information pertaining to IAB node 103-2 and/or other IAB nodes 103. In some embodiments, IAB donor 101 may provide only the maximum bandwidth information associated with IAB node 103-1 to IAB node 103-1, may provide only the maximum bandwidth information associated with IAB node 103-2 to IAB node 103-2, and so on.

FIG. 8B illustrates another arrangement of maximum bandwidth information that may be received and/or propagated by IAB donor 101. For example, such information may be indicated on a per-link basis. As noted above, each IAB link 105 may be associated with two nodes (e.g., two IAB nodes 103, or IAB donor 101 and IAB node 103), and each access link 107 may be associated with a node (e.g., IAB donor 101 or IAB node 103) and a particular UE 109. As such, the "Cell/UE IDs" field may include a pair of identifiers indicating a node pair or a node-UE pair. The identifier for a given UE 109 may include an IP address, a Mobile Directory Number ("MDN"), an International Mobile Station Equipment Identity ("IMEI") value, an International Mobile Subscriber Identity ("IMSI") value, a Subscription Permanent Identifier ("SUPI"), a Globally Unique Temporary Identifier ("GUTI"), and/or some other suitable identifier. As similarly discussed above, data structure 803 may be broadcasted (e.g., provided to multiple or all IAB nodes 103) and/or portions of data structure 803 may be directly provided only to particular IAB nodes 103 associated with such portions (e.g., IAB node 103-1 may receive maximum bandwidth information associated with IAB Links 1 and 2 and Access Links 1-3, but not IAB Link 3 or Access Links 4 and 5).

Figure 9:
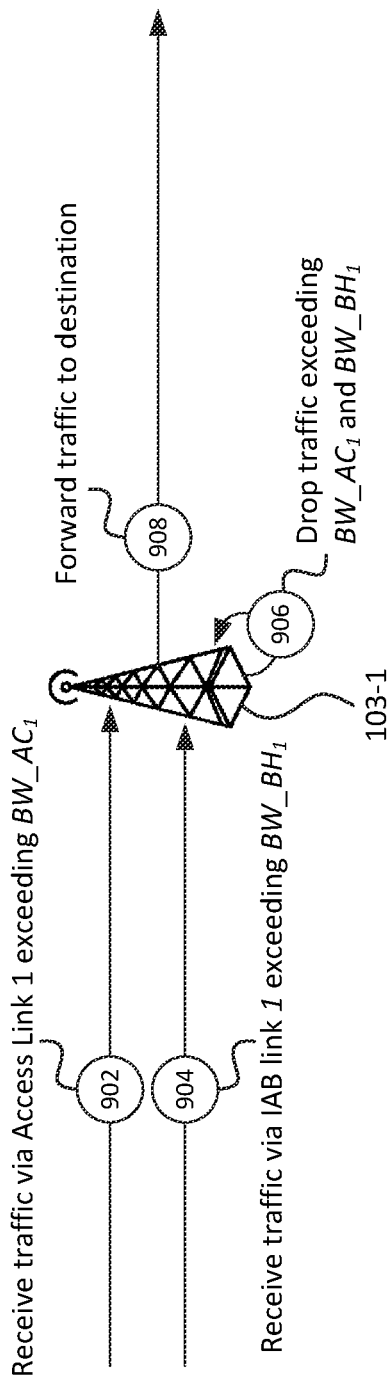
FIG. 9 illustrates an example enforcement of one or more bandwidth allocations by an IAB node, in accordance with some embodiments.
Figure 10:
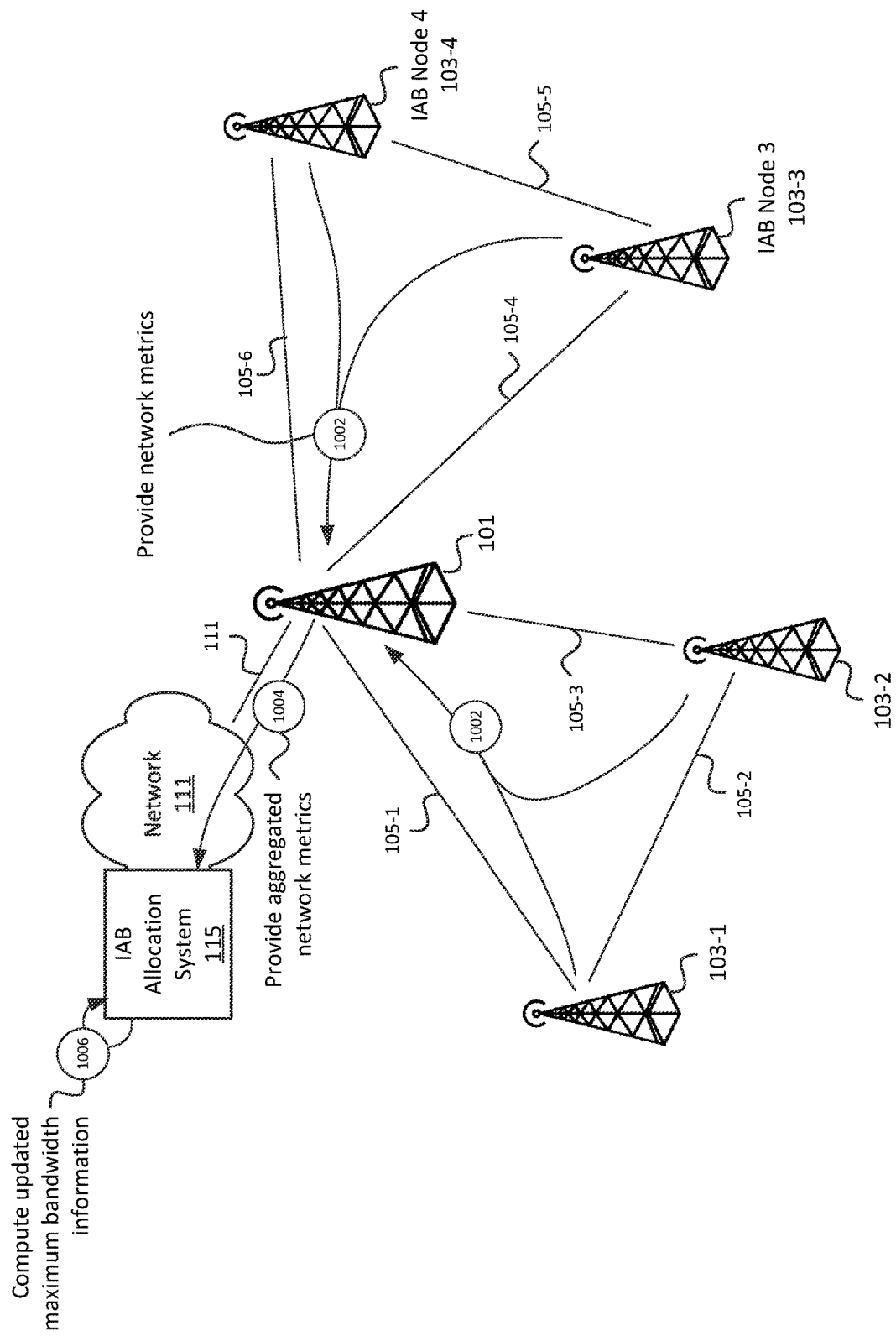
FIG. 10 illustrates an example determination of updated bandwidth allocations based on network metrics associated with a set of IAB nodes over a particular period of time.

Once a given node receives the maximum bandwidth information, such node may use the information to enforce throughput limits on traffic received over pertinent links. For example, as shown in FIG. 9, IAB node 103-1 may receive (at 902) traffic via Access Link 1 over a given time period, where the amount of traffic received via Access Link 1 exceeds the maximum bandwidth BW_AC$_1$ for that time period. For example, IAB node 103-1 may have received uplink traffic from UE 109-1 that exceeds the maximum bandwidth BW_AC$_1$, may have received downlink traffic destined for UE 109-1 (e.g., from network 111 and/or from some other source) that exceeds the maximum bandwidth BW_AC$_1$, and/or may have received uplink and downlink traffic associated with UE 109-1 that in aggregate exceeds the maximum bandwidth BW_AC$_1$.

Similarly, IAB node 103-1 may receive (at 904) traffic via IAB Link 1 over the given time period, where the amount of traffic received via IAB Link 1 exceeds the maximum bandwidth BW_BH$_1$ for the time period. For example, IAB node 103-1 may have received uplink traffic from UEs 109-1 through 109-3, destined for network 111, that in aggregate exceeds the maximum bandwidth BW_BH$_1$. As another example, IAB node 103-1 may have received downlink traffic (e.g., destined for UEs 109-1, 109-2, and/or 109-3) from IAB donor 101, where the amount of such downlink traffic over the time period exceeds the maximum bandwidth BW_BH$_1$. As yet another example, IAB node 103-1 may have received backhaul traffic from another node (e.g., from IAB node 103-2 via IAB Link 2) to be relayed to IAB donor 101 via IAB Link 1. Additionally, or alternatively, IAB node 103-1 may have received uplink and downlink traffic (e.g., associated with UEs 109-1, 109-2, and/or 109-3) and/or IAB traffic that in aggregate exceeds the maximum bandwidth BW_BH$_1$.

As further shown, IAB node 103-1 may drop (at 906) the traffic that exceeds the maximum bandwidths BW_BH$_1$ and BW_AC$_1$. For example, assuming that 15 GB of access traffic was received (at 902) via Access Link 1 over the given time period and the maximum access traffic bandwidth BW_AC$_1$ is 10 GB, IAB node 103-1 may drop (at 906) 5 GB of the access traffic received via Access Link 1. Similarly, assuming that 30 GB of IAB traffic was received (at 904) via IAB Link 1 over the given time period and the maximum access traffic bandwidth BW_BH$_1$ is 20 GB, IAB node 103-1 may drop (at 906) 10 GB of the IAB traffic received via IAB Link 1.

In some embodiments, instead of dropping traffic, IAB node 103-1 may de-prioritize traffic exceeding the maximum bandwidths, such as by reducing queue weights, Quality of Service ("QoS") levels, or the like associated with such traffic. In some embodiments, IAB node 103-1 may treat such excess traffic (e.g., where "excess" traffic refers to traffic exceeding a respective maximum bandwidth) differently based on an amount of load associated with IAB node 103-1. For example, if IAB node 103-1 is relatively loaded or congested, IAB node 103-1 may drop excess traffic. On the other hand, if IAB node 103-1 is relatively less loaded or congested, IAB node 103-1 may modify queue weights, QoS levels, etc. associated with the excess traffic.

In some embodiments, IAB node 103-1 may handle excess access traffic and IAB traffic differently. For example, IAB node 103-1 may drop excess access traffic, and may modify queue weights, QoS levels, etc., associated with excess IAB traffic. In some embodiments, IAB node 103-1 may modify queue weights, QoS levels, etc. differently based on a measure of load or congestion associated with IAB node 103-1. For example, if IAB node 103-1 is relatively loaded or congested, IAB node 103-1 may modify queue weights, QoS levels, etc. associated with excess traffic to be lower than a situation in which IAB node 103-1 is less loaded or congested.

As further shown, IAB node 103-1 may forward (at 908) the received traffic toward its intended destination. For example, IAB node 103-1 may forward the access traffic and IAB traffic that was not dropped. Further, IAB node 103-1 may forward (at 908) excess traffic that was de-prioritized, as described above.

The determination of maximum bandwidth information, as discussed above, may be performed in a time-series and/or iterative manner, such that the maximum bandwidth information may continue to be refined, tuned, etc. on ongoing basis. For example, IAB nodes 103 may provide (at 1002) network metrics to IAB donor 101 and/or to IAS 115 on a periodic, intermittent, or other ongoing basis. The network metrics may indicate, for example, amount of throughput used for particular IAB links 105 and/or access links 107, amount of traffic dropped for particular IAB links 105 and/or access links 107, amount of traffic de-prioritized for particular IAB links 105 and/or access links 107, load and/or congestion metrics associated with IAB nodes 103, and/or other suitable information. IAB donor 101 may provide (at 1004) aggregated metrics associated with IAB donor 101 and IAB nodes 103 to IAS 115, which may compute (at 1006) updated maximum bandwidth information for IAB donor 101 and/or IAB nodes 103 based on the aggregated network metrics.

In some embodiments, IAS 115 may utilize AI/ML techniques or other suitable techniques to refine the maximum bandwidth information, and/or to associate discrete sets of maximum bandwidth information with other factors. For example, IAS 115 may determine a first set of maximum bandwidth information for a first time of day (e.g., a time of day associated with a morning commute or workday) and a second set of maximum bandwidth information for a second time of day (e.g., a time of day associated with night time). As another example, IAS 115 may determine a first set of maximum bandwidth information for a first geographical region, and a second set of maximum bandwidth information for a second geographical region.

As yet another example, IAS 115 may determine a first set of maximum bandwidth information when access traffic includes at least a threshold proportion or percentage of a particular traffic type, and may determine a second set of maximum bandwidth information when access traffic includes less than the threshold proportion or percentage of the particular traffic type. For example, if access traffic associated with UEs 109-1 through 109-3 (connected to IAB node 103-1) includes at least 60% of video streaming traffic, IAS 115 may determine a first maximum access traffic bandwidth and/or a first IAB traffic bandwidth associated with IAB node 103-1, and when access traffic associated with UEs 109-1 through 109-3 includes less than 60% of video streaming traffic, IAS 115 may determine a second maximum access traffic bandwidth and/or a second IAB traffic bandwidth associated with IAB node 103-1.

Figure 11:
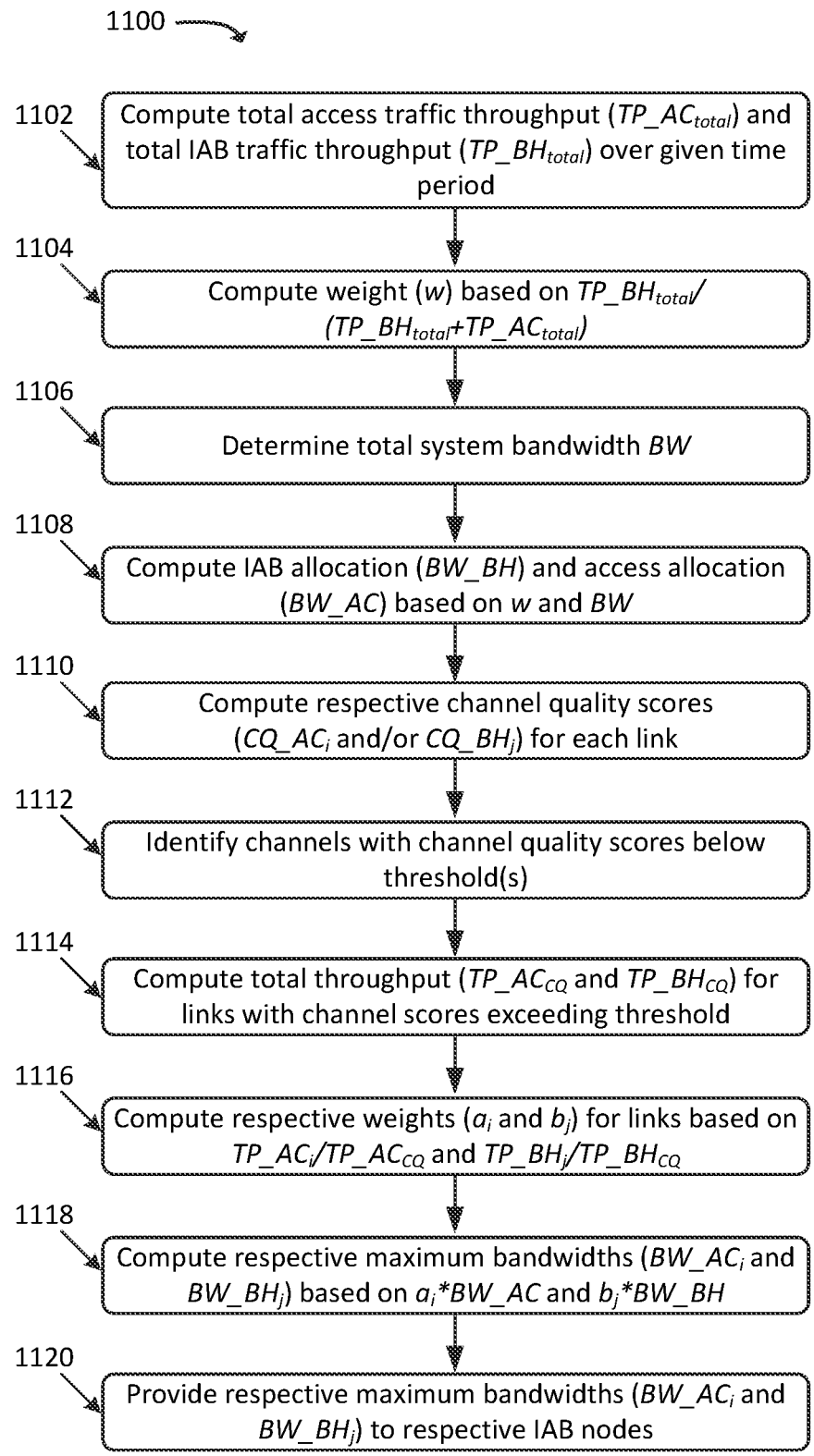
FIG. 11 illustrates an example process for determining maximum bandwidths for various links, including IAB links and/or access links, in a network that implements an IAB architecture, in accordance with some embodiments.

FIG. 11 illustrates an example process 1100 for determining maximum bandwidths for various links, including IAB links and/or access links, in a network that implements an IAB architecture. In some embodiments, some or all of process 1100 may be performed by IAS 115. In some embodiments, one or more other devices may perform some or all of process 1100 (e.g., in concert with, and/or in lieu of, IAS 115).

As shown, process 1100 may include computing (at 1102) a total access traffic throughput and total IAB traffic throughput associated with a set of IAB nodes (e.g., IAB donor 101 and one or more IAB nodes 103) over a given time period. For example, as discussed above, IAS 115 may compute, for IAB donor 101 and one or more IAB nodes 103, a total amount of IAB traffic $TP\_BH_{total}$ and a total amount of access traffic $TP\_AC_{total}$ sent between IAB donor 101, IAB nodes 103, and/or UEs 109 over the given time period.

Process 1100 may further include computing (at 1104) a weight based on the total access link throughput and total IAB link throughput. For example, as discussed above, IAS 115 may compute the weight w based on a ratio of total IAB traffic throughput, over the given time period, to the total throughput over the given time period. In some embodiments, such computation may include and/or may be based on Formula 1:

$$w = TP\_BH_{total}/(TP\_BH_{total} + TP\_AC_{total}) \quad \text{(Formula 1)}$$

Process 1100 may additionally include determining (at 1106) a total system bandwidth associated with IAB donor 101 and IAB nodes 103. For example, as discussed above, IAS 115 may determine a total bandwidth or capacity BW associated with IAB donor 101 and IAB nodes 103, which may reflect a total amount of traffic that IAB donor 101 and IAB nodes 103 are able to handle (e.g., without degrading performance or reliability) over the given time period.

Process 1100 may also include computing (at 1108) an IAB allocation and an access allocation based on the determined (at 1104) weight and the total system bandwidth. For example, as discussed above, IAS 115 may determine the IAB allocation BW_BH and access allocation BW_AC according to Formulas 2 and 3, respectively:

$$BW\_BH = w*BW \quad \text{(Formula 2)}$$

$$BW\_AC = (1-w)*BW \quad \text{(Formula 3)}$$

Process 1100 may further include computing (at 1110) respective channel quality scores for links associated with IAB donor 101, IAB nodes 103, and/or one or more UEs 109. As discussed above, channel quality scores may include and/or may be based on SNR metrics, SINR metrics, RSSI metrics, and/or other suitable indicators of channel quality, interference, signal strength, etc. for channels between IAB donor 101 and one or more UEs 109, for channels between IAB donor 101 and one or more IAB nodes 103, for channels between IAB nodes 103, and/or for channels between one or more IAB nodes 103 and one or more UEs 109.

Process 1100 may additionally include identifying (at 1112) links with channel quality scores below one or more thresholds. For example, as discussed above, IAS 115 may compare the respective channel quality scores for particular links to one or more suitable thresholds, and may identify particular links that exceed and/or do not exceed such thresholds.

Process 1100 may also include computing (at 1114) measures of total throughput for access traffic and IAB traffic for the links with channel quality scores exceeding the one or more thresholds. For example, as discussed above, IAS 115 may compute the total throughput $TP\_AC_{CQ}$ for access traffic received by IAB donor 101 and/or IAB nodes 103 over the given time period, via access links 107 associated with channel quality scores that exceed the one or more thresholds. IAS 115 may also compute the total throughput $TP\_BH_{CQ}$ for IAB traffic received by IAB donor 101 and/or IAB nodes 103 over the given time period, via IAB links 105 associated with channel quality scores that exceed the one or more thresholds.

Process 1100 may further include computing (at 1116) respective weights for the links (e.g., the links identified at 1112) based on respective measures of throughput associated with IAB links and access links as well as total measures of system throughput for IAB links and access links. For example, as discussed above, IAS 115 may determine respective weights $a_i$ for access links 107 (e.g., where a particular weight $a_i$ is associated with a particular access link 107-$i$) and respective weights $b_j$ for IAB links 105 (e.g., where a particular weight $b_j$ is associated with a particular IAB link 105-$j$) according to Formulas 4 and 5:

$$a_i = TP\_AC_i / TP\_AC_{CQ} \quad \text{(Formula 4)}$$

$$b_j = TP\_BH_j / TP\_BH_{CQ} \quad \text{(Formula 5)}$$

Process 1100 may additionally include computing (at 1118) respective maximum bandwidths based on the weights (computed at 1116) and the IAB and access allocations (computed at 1108). For example, as discussed above, the maximum bandwidth for a given link may be computed based on the weight for that link (e.g., as computed at 1116) and the allocation (computed at 1108) for that type of link. Thus, the maximum bandwidth for a given link may be a function of one or more of: (a) the amount of throughput associated with the link over the given time period, (b) the amount of throughput associated with the same type of link over the given time period (e.g., where "type" of link refers to access or IAB links), (c) the amount of throughput associated with links of the same type that are associated with at least a threshold channel quality score, (d) a total system bandwidth (e.g., capacity), and (e) a total amount of throughput associated with IAB donor 101 and IAB nodes 103 over the given time period. In some embodiments, the maximum access bandwidth $BW\_AC_i$ for a particular access link 107-$i$ may be computed according to Formula 6, and the maximum IAB bandwidth $BW\_BH_j$ for a particular IAB link 105-$j$ may be computed according to Formula 7:

$$BW\_AC_i = a_i * BW\_AC \quad \text{(Formula 4)}$$

$$BW\_BH_j = b_j * BW\_BH \quad \text{(Formula 5)}$$

Process 1100 may also include providing (at 1120) the maximum bandwidths to respective IAB nodes. For example, as discussed above, IAS 115 may output the maximum bandwidths (e.g., as computed at 1118) to IAB donor 101 and/or to IAB nodes 103 via some suitable interface or communication pathway. For example, IAS 115 may provide such information to IAB donor 101, which may relay the information to IAB nodes 103 via broadcast and/or direct messaging, as discussed above. As further discussed above, IAB donor 101 and IAB nodes 103 may enforce the maximum bandwidths by dropping, de-prioritizing, and/or otherwise differently handling traffic that is in excess of the respective maximum bandwidths.

Figure 12:
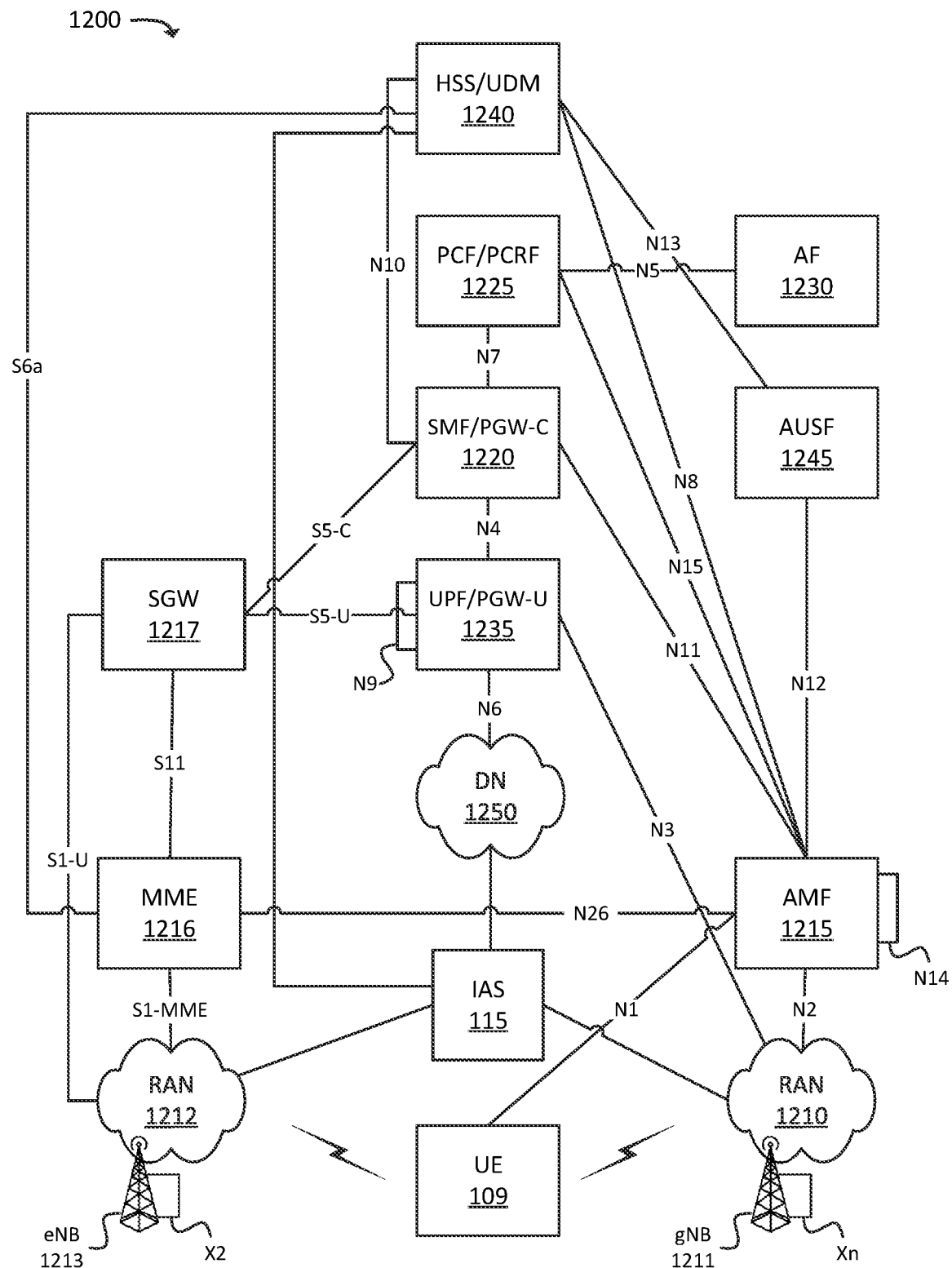
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a 5G network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an EPC). As shown, environment 1200 may include UE 109, RAN 1210 (which may include one or more gNBs 1211), RAN 1212 (which may include one or more one or more eNBs 1213), and various network functions such as Access and Mobility Management Function ("AMF") 1215, Mobility Management Entity ("MME") 1216, Serving Gateway ("SGW") 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Home Subscriber Server ("HSS")/Unified Data Management ("UDM") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250), such as IAS 115.

The example shown in FIG. 12 illustrates one instance of each network component or function (e.g., one instance of SMF/PGW-C 1220, PCF/PCRF 1225, UPF/PGW-U 1235, HSS/UDM 1240, and/or 1245). In practice, environment 1200 may include multiple instances of such components or functions. For example, in some embodiments, environment 1200 may include multiple "slices" of a core network, where each slice includes a discrete set of network functions (e.g., one slice may include a first instance of SMF/PGW-C 1220, PCF/PCRF 1225, UPF/PGW-U 1235, HSS/UDM 1240, and/or 1245, while another slice may include a second instance of SMF/PGW-C 1220, PCF/PCRF 1225, UPF/PGW-U 1235, HSS/UDM 1240, and/or 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 109 may include a computation and communication device, such as a wireless mobile communication device that is capable of communicating with RAN 1210, RAN 1212, and/or DN 1250. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 109 may send traffic to and/or receive traffic (e.g., user plane traffic) from DN 1250 via RAN 1210, RAN 1212, and/or UPF/PGW-U 1235.

RAN 1210 may be, or may include, a 5G RAN that includes one or more base stations (e.g., one or more gNBs 1211), via which UE 109 may communicate with one or more other elements of environment 1200. UE 109 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 109 via the air interface, and may communicate the traffic to UPF/PGW-U 1235, and/or one or more other devices or networks. Similarly, RAN 1210 may receive traffic intended for UE 109 (e.g., from UPF/PGW-U 1235, AMF 1215, and/or one or more other devices or networks) and may communicate the traffic to UE 109 via the air interface. In some embodiments, IAB donor 101 and/or IAB node 103 may be, may include, and/or may be implemented by one or more gNBs 1211.

RAN 1212 may be, or may include, a LTE RAN that includes one or more base stations (e.g., one or more eNBs 1213), via which UE 109 may communicate with one or more other elements of environment 1200. UE 109 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 109 via the air interface, and may communicate the traffic to UPF/PGW-U 1235, and/or one or more other devices or networks. Similarly, RAN 1210 may receive traffic intended for UE 109 (e.g., from UPF/PGW-U 1235, SGW 1217, and/or one or more other devices or networks) and may communicate the traffic to UE 109 via the air interface. In some embodiments, IAB donor 101 and/or IAB node 103 may be, may include, and/or may be implemented by one or more eNBs 1213.

AMF 1215 may include one or more devices, systems, Virtualized Network Functions ("VNFs"), etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 1212 and/or eNBs 1213, and/or to perform other operations.

SGW 1217 may include one or more devices, systems, VNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, etc., that gather, process, store, and/or provide information in a manner described herein. SMF/PGW-C 1220 may, for example, facilitate in the establishment of communication sessions on behalf of UE 109. In some embodiments, the establishment of communications sessions may be performed in accordance with one or more policies provided by PCF/PCRF 1225.

PCF/PCRF 1225 may include one or more devices, systems, VNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, etc., that receive, store, and/or provide information that may be used in determining parameters (e.g., quality of service parameters, charging parameters, or the like) for certain applications.

UPF/PGW-U 1235 may include one or more devices, systems, VNFs, etc., that receive, store, and/or provide data (e.g., user plane data). For example, UPF/PGW-U 1235 may receive user plane data (e.g., voice call traffic, data traffic, etc.), destined for UE 109, from DN 1250, and may forward the user plane data toward UE 109 (e.g., via RAN 1210, SMF/PGW-C 1220, and/or one or more other devices). In some embodiments, multiple UPFs 1235 may be deployed (e.g., in different geographical locations), and the delivery of content to UE 109 may be coordinated via the N9 interface (e.g., as denoted in FIG. 12 by the line marked "N9" originating and terminating at UPF/PGW-U 1235). Similarly, UPF/PGW-U 1235 may receive traffic from UE 109 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 109.

DN 1250 may include one or more wired and/or wireless networks. For example, DN 1250 may include an Internet Protocol IP-based PDN, a wide area network ("WAN") such as the Internet, a private enterprise network, and/or one or more other networks. UE 109 may communicate, through DN 1250, with data servers, other UEs 109, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 109 may communicate.

Figure 13:
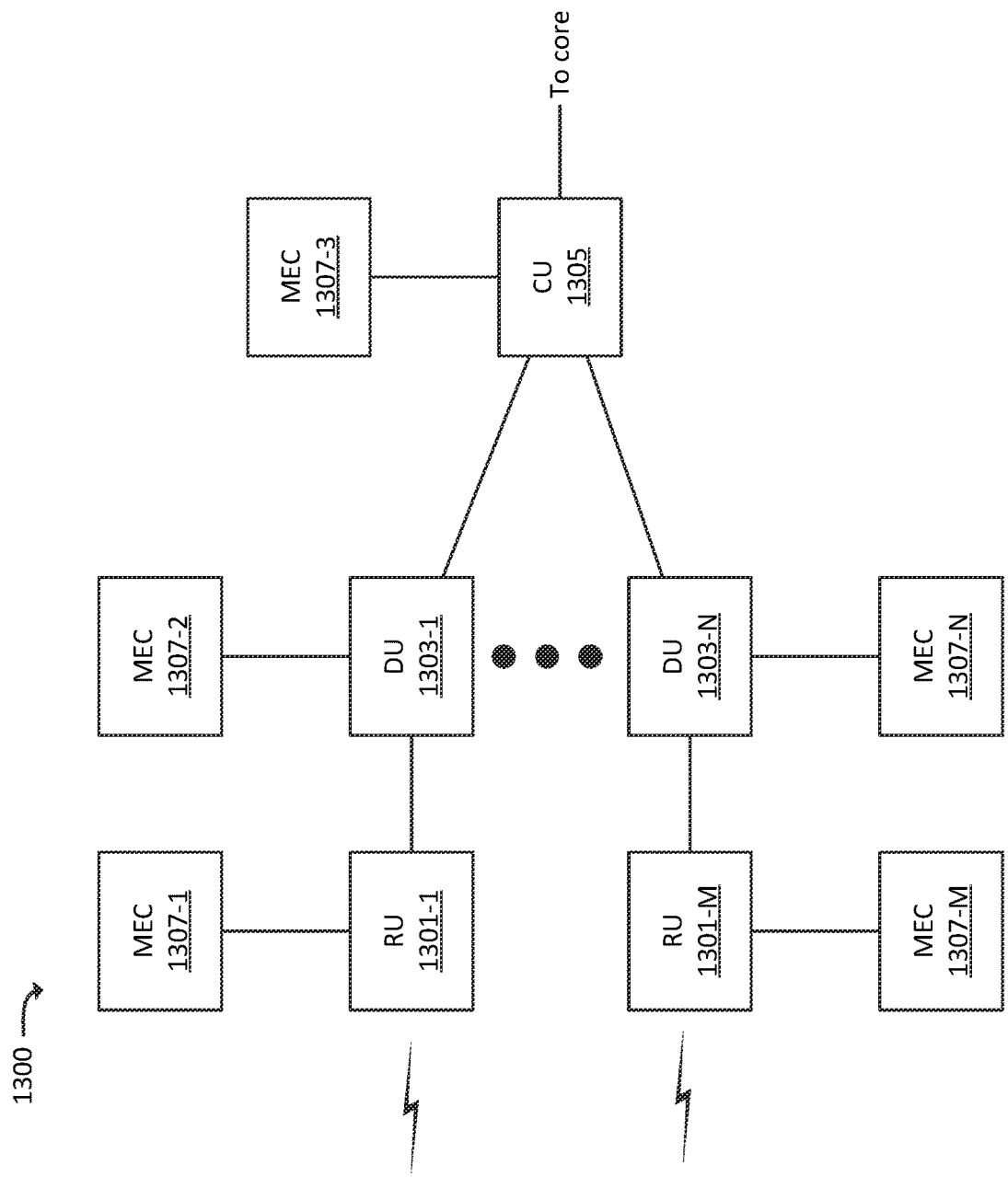
FIG. 13 illustrates an example arrangement of a radio access network ("RAN"), in accordance with some embodiments.

FIG. 13 illustrates an example Distributed Unit ("DU") network 1300, which may be included in and/or implemented by one or more RANs (e.g., RAN 1210, RAN 1212, or some other RAN). In some embodiments, a particular RAN may include one DU network 1300. In some embodiments, a particular RAN may include multiple DU networks 1300. In some embodiments, DU network 1300 may correspond to a particular gNB 1211 of a 5G RAN (e.g., RAN 1210). In some embodiments, DU network 1300 may correspond to multiple gNBs 1211. In some embodiments, DU network 1300 may correspond to one or more other types of base stations of one or more other types of RANs. As shown, DU network 1300 may include Central Unit ("CU") 1305, one or more Distributed Units ("DUs") 1303-1 through 1303-N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 109 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 109, and may determine which DU(s) 1303 should receive the downlink traffic. DU 1303 may include one or more devices that transmit traffic between a core network (e.g., via CU 1305) and UE 109 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 109.

RU 1301 may include hardware circuitry (e.g., one or more RF transceivers, antennas, radios, and/or other suitable hardware) to communicate wirelessly (e.g., via an RF interface) with one or more UEs 109, one or more other DUs 1303 (e.g., via RUs 1301 associated with DUs 1303), and/or any other suitable type of device. In the uplink direction, RU 1301 may receive traffic from UE 109 and/or another DU 1303 via the RF interface and may provide the traffic to DU 1303. In the downlink direction, RU 1301 may receive traffic from DU 1303, and may provide the traffic to UE 109 and/or another DU 1303.

RUs 1301 may, in some embodiments, be communicatively coupled to one or more Multi-Access/Mobile Edge Computing ("MEC") devices, referred to sometimes herein simply as "MECs" 1307. For example, RU 1301-1 may be communicatively coupled to MEC 1307-1, RU 1301-M may be communicatively coupled to MEC 1307-M, DU 1303-1 may be communicatively coupled to MEC 1307-2, DU 1303-N may be communicatively coupled to MEC 1307-N, CU 1305 may be communicatively coupled to MEC 1307-3, and so on. MECs 1307 may include hardware resources (e.g., configurable or provisionable hardware resources) that may be configured to provide services and/or otherwise process traffic to and/or from UE 109, via a respective RU 1301.

For example, RU 1301-1 may route some traffic, from UE 109, to MEC 1307-1 instead of to a core network (e.g., via DU 1303 and CU 1305). MEC 1307-1 may process the traffic, perform one or more computations based on the received traffic, and may provide traffic to UE 109 via RU 1301-1. In this manner, ultra-low latency services may be provided to UE 109, as traffic does not need to traverse DU 1303, CU 1305, and an intervening backhaul network between DU network 1300 and the core network. In some embodiments, as discussed above, MEC 1307 may include, and/or may implement, some or all of the functionality described above with respect to IAS 115.

Figure 14:
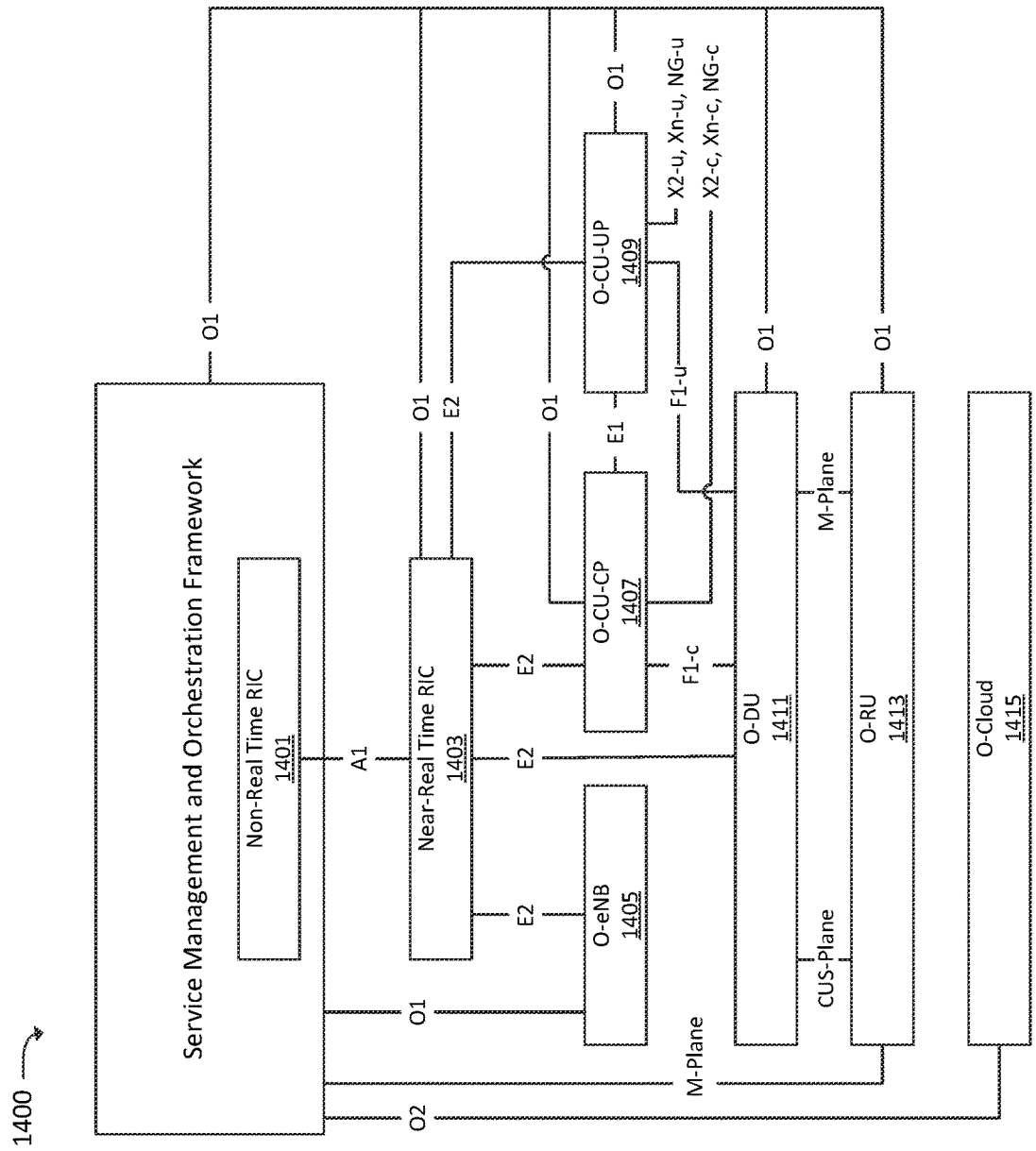
FIG. 14 illustrates an example arrangement of an Open RAN ("O-RAN") environment in which one or more embodiments, described herein, may be implemented.

FIG. 14 illustrates an example O-RAN environment 1400, which may correspond to RAN 1210, RAN 1212, and/or DU network 1300. For example, RAN 1210, RAN 1212, and/or DU network 1300 may include one or more instances of O-RAN environment 1400, and/or one or more instances of O-RAN environment 1400 may implement RAN 1210, RAN 1212, DU network 1300, and/or some portion thereof. As shown, O-RAN environment 1400 may include Non-Real Time Radio Intelligent Controller ("RIC") 1401, Near-Real Time RIC 1403, O-eNB 1405, O-CU-Control Plane ("O-CU-CP") 1407, O-CU-User Plane ("O-CU-UP") 1409, O-DU 1411, O-RU 1413, and O-Cloud 1415. In some embodiments, O-RAN environment 1400 may include additional, fewer, different, and/or differently arranged components.

In some embodiments, some or all of the elements of O-RAN environment 1400 may be implemented by one or more configurable or provisionable resources, such as virtual machines, cloud computing systems, physical servers, and/or other types of configurable or provisionable resources. In some embodiments, some or all of O-RAN environment 1400 may be implemented by, and/or communicatively coupled to, one or more MECs 1307.

Non-Real Time RIC 1401 and Near-Real Time RIC 1403 may receive performance information (and/or other types of information) from one or more sources, and may configure other elements of O-RAN environment 1400 based on such performance or other information. For example, Near-Real Time RIC 1403 may receive performance information, via one or more E2 interfaces, from O-eNB 1405, O-CU-CP 1407, and/or O-CU-UP 1409, and may modify parameters associated with O-eNB 1405, O-CU-CP 1407, and/or O-CU-UP 1409 based on such performance information. Similarly, Non-Real Time RIC 1401 may receive performance information associated with O-eNB 1405, O-CU-CP 1407, O-CU-UP 1409, and/or one or more other elements of O-RAN environment 1400 and may utilize machine learning and/or other higher level computing or processing to determine modifications to the configuration of O-eNB 1405, O-CU-CP 1407, O-CU-UP 1409, and/or other elements of O-RAN environment 1400. In some embodiments, Non-Real Time RIC 1401 may generate machine learning models based on performance information associated with O-RAN environment 1400 or other sources, and may provide such models to Near-Real Time MC 1403 for implementation.

O-eNB 1405 may perform functions similar to those described above with respect to eNB 1213. For example, O-eNB 1405 may facilitate wireless communications between UE 109 and a core network. O-CU-CP 1407 may perform control plane signaling to coordinate the aggregation and/or distribution of traffic via one or more DUs 1303, which may include and/or be implemented by one or more O-DUs 1411, and O-CU-UP 1409 may perform the aggregation and/or distribution of traffic via such DUs 1303 (e.g., O-DUs 1411). O-DU 1411 may be communicatively coupled to one or more RUs 1301, which may include and/or may be implemented by one or more O-RUs 1413. In some embodiments, O-Cloud 1415 may include or be implemented by one or more MECs 1307, which may provide services, and may be communicatively coupled, to O-CU- CP 1407, O-CU-UP 1409, O-DU 1411, and/or O-RU 1413 (e.g., via an O1 and/or O2 interface).

Figure 15:
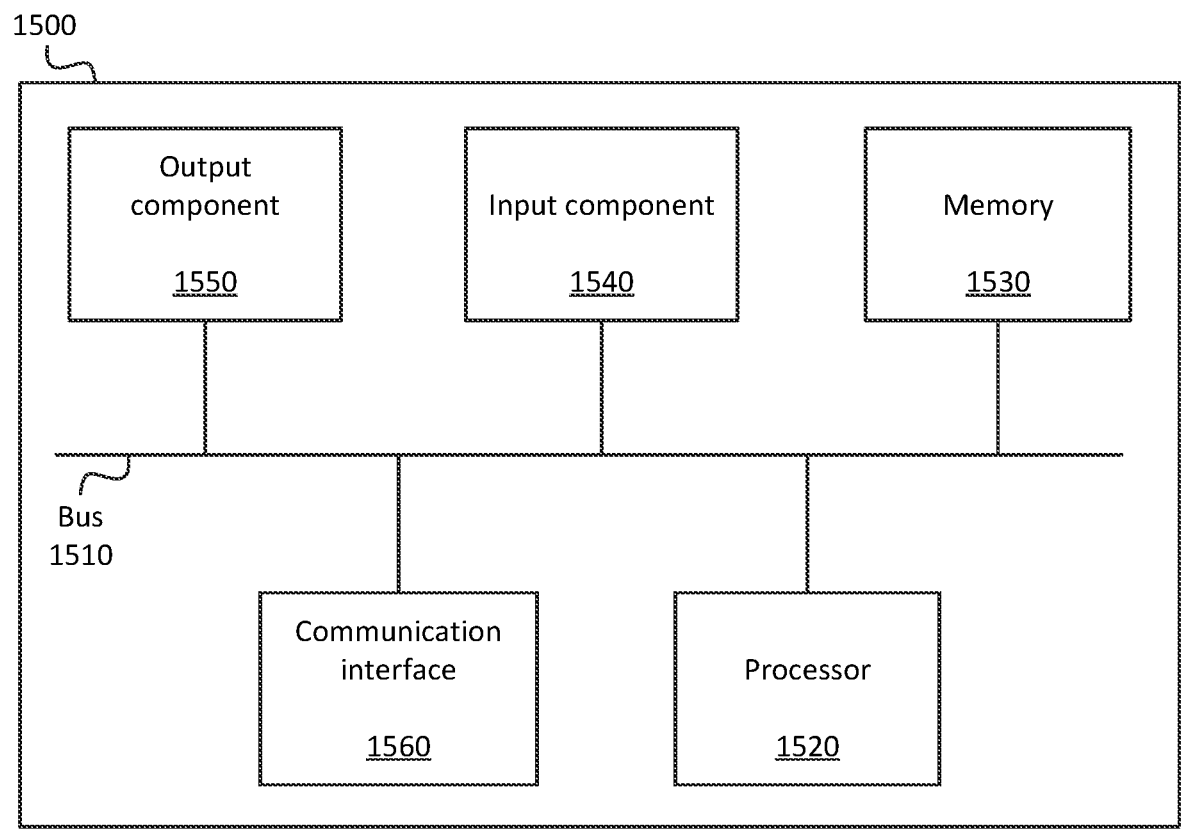
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 2-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   determine a bandwidth capacity associated with a set of Integrated Access Backhaul ("IAB") nodes of a radio access network ("RAN");
   determine a first measure of total throughput used by the set of IAB nodes for IAB traffic during a first time period, the IAB traffic including traffic wirelessly communicated between at least a first IAB node and a second IAB node;
   determine a second measure of total throughput used by the set of IAB nodes for access traffic during the first time period, the access traffic including traffic wirelessly communicated between at least the first IAB node and one or more User Equipment ("UEs");
   determine a third measure of throughput used by the first IAB node for IAB traffic during the first time period;
   identify channel quality scores associated with the set of IAB nodes;
   identify one or more IAB nodes associated with channel quality scores that exceed a threshold score;
   determine a fourth measure of throughput used by the one or more IAB nodes for IAB traffic during the first time period, wherein the fourth measure of throughput excludes throughput used by IAB nodes, of the set of IAB nodes, associated with channel quality scores that do not exceed the threshold score;
   determine a maximum bandwidth for IAB traffic for the first IAB node, based on:
      the bandwidth capacity associated with the set of IAB nodes,
      the first measure of total throughput used by the set of IAB nodes for IAB traffic during the first time period,
      the second measure of total throughput used by the set of IAB nodes for access traffic during the first time period,
      the third measure of throughput used by the first IAB node for IAB traffic during the first time period, and
      the fourth measure of throughput; and
   provide an indication of the maximum bandwidth for IAB traffic to the first IAB node, wherein, based on receiving the indication, the first IAB node enforces the maximum bandwidth for IAB traffic over a second time period.

2. The device of claim 1, wherein the second time period is subsequent to the first time period.

3. The device of claim 1, wherein the one or more processors are further configured to:
   determine a maximum bandwidth for access traffic for the first IAB node, based on:
      the bandwidth capacity associated with the set of IAB nodes,
      the first measure of total throughput used by the set of IAB nodes for IAB traffic during the first time period,
      the second measure of total throughput used by the set of IAB nodes for access traffic during the first time period, and
      a fifth measure of throughput used by the first IAB node for access traffic during the first time period; and
   provide an indication of the maximum bandwidth for access traffic to the first IAB node, wherein the first IAB node enforces the maximum bandwidth for access traffic over the second time period.

4. The device of claim 1, wherein first IAB node enforces the maximum bandwidth for IAB traffic over the second time period by dropping IAB traffic, received during the second time period, that is in excess of the maximum bandwidth for IAB traffic.

5. The device of claim 1, wherein the one or more processors are further configured to determine a traffic type associated with the IAB traffic,
   wherein the maximum bandwidth for IAB traffic is further based on the determined traffic type.

6. A non-transitory computer-readable medium, storing a plurality of processor-executable instructions to:
   determine a bandwidth capacity associated with a set of Integrated Access Backhaul ("IAB") nodes of a radio access network ("RAN");
   determine a first measure of total throughput used by the set of IAB nodes for IAB traffic during a first time period, the IAB traffic including traffic wirelessly communicated between at least a first IAB node and a second IAB node;
   determine a second measure of total throughput used by the set of IAB nodes for access traffic during the first time period, the access traffic including traffic wirelessly communicated between at least the first IAB node and one or more User Equipment ("UEs");
   determine a third measure of throughput used by the first IAB node for IAB traffic during the first time period;
   identify channel quality scores associated with the set of IAB nodes;
   identify one or more IAB nodes associated with channel quality scores that exceed a threshold score;
   determine a fourth measure of throughput used by the one or more IAB nodes for IAB traffic during the first time period, wherein the fourth measure of throughput excludes throughput used by IAB nodes, of the set of IAB nodes, associated with channel quality scores that do not exceed the threshold score;
   determine a maximum bandwidth for IAB traffic for the first IAB node, based on:
      the bandwidth capacity associated with the set of IAB nodes,
      the first measure of total throughput used by the set of IAB nodes for IAB traffic during the first time period,
      the second measure of total throughput used by the set of IAB nodes for access traffic during the first time period,
      the third measure of throughput used by the first IAB node for IAB traffic during the first time period, and
      the fourth measure of throughput; and
   provide an indication of the maximum bandwidth for IAB traffic to the first IAB node, wherein, based on receiving the indication, the first IAB node enforces the maximum bandwidth for IAB traffic over a second time period.

7. The non-transitory computer-readable medium of claim 6, wherein the second time period is subsequent to the first time period.

8. The non-transitory computer-readable medium of claim 6, wherein the plurality of processor-executable instructions further include processor-executable instructions to:
determine a maximum bandwidth for access traffic for the first IAB node, based on:
the bandwidth capacity associated with the set of IAB nodes,
the first measure of total throughput used by the set of IAB nodes for IAB traffic during the first time period,
the second measure of total throughput used by the set of IAB nodes for access traffic during the first time period, and
a fifth measure of throughput used by the first IAB node for access traffic during the first time period; and
provide an indication of the maximum bandwidth for access traffic to the first IAB node, wherein the first IAB node enforces the maximum bandwidth for access traffic over the second time period.

9. The non-transitory computer-readable medium of claim 6, wherein first IAB node enforces the maximum bandwidth for IAB traffic over the second time period by dropping IAB traffic, received during the second time period, that is in excess of the maximum bandwidth for IAB traffic.

10. The non-transitory computer-readable medium of claim 6, wherein the plurality of processor-executable instructions further include processor-executable instructions to determine a traffic type associated with the IAB traffic,
wherein the maximum bandwidth for IAB traffic is further based on the determined traffic type.

11. A method, comprising:
determining a bandwidth capacity associated with a set of Integrated Access Backhaul ("IAB") nodes of a radio access network ("RAN");
determining a first measure of total throughput used by the set of IAB nodes for IAB traffic during a first time period, the IAB traffic including traffic wirelessly communicated between at least a first IAB node and a second IAB node;
determining a second measure of total throughput used by the set of IAB nodes for access traffic during the first time period, the access traffic including traffic wirelessly communicated between at least the first IAB node and one or more User Equipment ("UEs");
determining a third measure of throughput used by the first IAB node for IAB traffic during the first time period;
identifying channel quality scores associated with the set of IAB nodes;
identifying one or more IAB nodes associated with channel quality scores that exceed a threshold score;
determining a fourth measure of throughput used by the one or more IAB nodes for IAB traffic during the first time period, wherein the fourth measure of throughput excludes throughput used by IAB nodes, of the set of IAB nodes, associated with channel quality scores that do not exceed the threshold score;
determining a maximum bandwidth for IAB traffic for the first IAB node, based on:
the bandwidth capacity associated with the set of IAB nodes,
the first measure of total throughput used by the set of IAB nodes for IAB traffic during the first time period,
the second measure of total throughput used by the set of IAB nodes for access traffic during the first time period,
the third measure of throughput used by the first IAB node for IAB traffic during the first time period, and
the fourth measure of throughput; and
providing an indication of the maximum bandwidth for IAB traffic to the first IAB node,
wherein, based on receiving the indication, the first IAB node enforces the maximum bandwidth for IAB traffic over a second time period.

12. The method of claim 11, wherein the second time period is subsequent to the first time period.

13. The method of claim 11, the method further comprising:
determine a maximum bandwidth for access traffic for the first IAB node, based on:
the bandwidth capacity associated with the set of IAB nodes,
the first measure of total throughput used by the set of IAB nodes for IAB traffic during the first time period,
the second measure of total throughput used by the set of IAB nodes for access traffic during the first time period, and
a fourth measure of throughput used by the first IAB node for access traffic during the first time period; and
provide an indication of the maximum bandwidth for access traffic to the first IAB node,
wherein the first IAB node enforces the maximum bandwidth for access traffic over the second time period.

14. The method of claim 11, wherein first IAB node enforces the maximum bandwidth for IAB traffic over the second time period by dropping IAB traffic, received during the second time period, that is in excess of the maximum bandwidth for IAB traffic.

15. The method of claim 11, further comprising:
determining a traffic type associated with the IAB traffic,
wherein the maximum bandwidth for IAB traffic is further based on the determined traffic type.

16. The method of claim 11, further comprising:
determining a maximum bandwidth for access traffic for the first IAB node; and
providing an indication of the maximum bandwidth for access traffic to the first IAB node, wherein the first IAB node enforces the maximum bandwidth for access traffic over the second time period.

17. The method of claim 16, wherein the maximum bandwidth for access traffic is determined based on at least one of:
the first measure of total throughput used by the set of IAB nodes for IAB traffic during the first time period, or
the second measure of total throughput used by the set of IAB nodes for access traffic during the first time period.

18. The device of claim 1, wherein the one or more processors are further configured to:
determine a maximum bandwidth for access traffic for the first IAB node; and provide an indication of the maximum bandwidth for access traffic to the first IAB node, wherein the first IAB node enforces the maximum bandwidth for access traffic over the second time period.

19. The device of claim 18, wherein the maximum bandwidth for access traffic is determined based on at least one of:
  the first measure of total throughput used by the set of IAB nodes for IAB traffic during the first time period, or
  the second measure of total throughput used by the set of IAB nodes for access traffic during the first time period.

20. The non-transitory computer-readable medium of claim 6, wherein the plurality of processor-executable instructions further include processor-executable instructions to:
  determine a maximum bandwidth for access traffic for the first IAB node based on at least one of:
    the first measure of total throughput used by the set of IAB nodes for IAB traffic during the first time period, or
    the second measure of total throughput used by the set of IAB nodes for access traffic during the first time period; and
  provide an indication of the maximum bandwidth for access traffic to the first IAB node, wherein the first IAB node enforces the maximum bandwidth for access traffic over the second time period.

\* \* \* \* \*